(12) United States Patent
Gallagher

(10) Patent No.: US 7,444,017 B2
(45) Date of Patent: Oct. 28, 2008

(54) DETECTING IRISES AND PUPILS IN IMAGES OF HUMANS

(75) Inventor: Andrew C. Gallagher, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 809 days.

(21) Appl. No.: 10/984,967

(22) Filed: Nov. 10, 2004

(65) Prior Publication Data

US 2006/0098867 A1    May 11, 2006

(51) Int. Cl.
*G06K 9/00* (2006.01)
*G06K 9/46* (2006.01)

(52) U.S. Cl. ..................... 382/167; 382/117

(58) Field of Classification Search ........... 382/115, 382/117, 118, 162, 164, 165, 167, 172, 181, 382/190, 195, 203, 218, 220, 266, 274, 291; 358/515, 518; 348/77, 78, 231.2, 576, 577
See application file for complete search history.

(56) References Cited

U.S. PATENT DOCUMENTS

| | | | |
|---|---|---|---|
| 3,069,654 A | 12/1962 | Hough | |
| 5,781,650 A | 7/1998 | Lobo et al. | |
| 6,134,339 A | 10/2000 | Luo | |
| 6,252,976 B1 | 6/2001 | Schildkraut et al. | |
| 6,292,574 B1 | 9/2001 | Schildkraut et al. | |
| 6,631,208 B1 | 10/2003 | Kinjo et al. | |
| 7,130,453 B2 * | 10/2006 | Kondo et al. | 382/117 |
| 7,174,034 B2 * | 2/2007 | O'Callaghan | 382/117 |
| 7,221,809 B2 * | 5/2007 | Geng | 382/280 |
| 7,254,256 B2 * | 8/2007 | Chen et al. | 382/117 |
| 7,295,686 B2 * | 11/2007 | Wu | 382/117 |
| 7,324,689 B1 * | 1/2008 | Vide | 382/167 |
| 7,324,693 B2 * | 1/2008 | Chen | 382/199 |
| 7,333,653 B2 * | 2/2008 | Luo et al. | 382/165 |
| 2003/0007687 A1 | 1/2003 | Nesterov et al. | |
| 2004/0197011 A1 | 10/2004 | Camus et al. | |
| 2006/0098867 A1 * | 5/2006 | Gallagher | 382/167 |
| 2006/0245624 A1 * | 11/2006 | Gallagher et al. | 382/118 |

(Continued)

FOREIGN PATENT DOCUMENTS

| | | |
|---|---|---|
| EP | 1 229 486 A1 | 8/2002 |
| WO | WO 03/071484 A1 | 8/2003 |

OTHER PUBLICATIONS

"Feature Extraction from Faces Using Deformable Templates", Yuille et al., Int. Journal of Comp. Vision, vol. 8, Issue 2, 1992, pp. 99-111.

(Continued)

*Primary Examiner*—Amir Alavi
(74) *Attorney, Agent, or Firm*—Robert Luke Walker

(57) ABSTRACT

In an eye detection method, a plurality of candidate eyes are located within a digital image. Pixels of interest having a predetermined characteristic and a predetermined association to respective eyes are found. Pixels of interest associated with each eye are grouped. Parametric boundaries are fit on each of the groups to define a plurality of detected eye features. The boundaries have a predefined uniform shape and a size matched to a respective group. Each of the detected eye features is scored as to a geometric relationship between the respective boundary and pixels of interest associated with the respective eye to provide eye feature scores.

64 Claims, 14 Drawing Sheets

U.S. PATENT DOCUMENTS

2007/0098303 A1* 5/2007 Gallagher et al. ............ 382/305
2007/0177805 A1* 8/2007 Gallagher ................... 382/190
2008/0112621 A1* 5/2008 Gallagher et al. ........... 382/190

OTHER PUBLICATIONS

"Detection of the Eyes from Human Faces by Hough Transform and Separability Filter", Kawaguchi et al., ICIP 2000 Proceedings, pp. 49-52.

"Finding Circles by an Arrary of Accumulators", Kimme et al., Communications of the ACM, vol. 18, No. 2, Feb. 1975, pp. 120-122.
Hartley and Zisserman, Multiple View Geometry, 2000, pp. 101-107.
"Color Image Retrieval Using Hybrid Graph Representation", I. Park et al., Image and Vision Computing, Elsevier, (1999), 17(7) pp. 465-474.
U.S. Appl. No. 10/792,079, filed Mar. 3, 2004, entitled: Correction of Redeye Defects in Images of Humans, in the names of Andrew C. Gallagher and Jay S. Schildkraut.

* cited by examiner

DETECTING IRISES AND PUPILS IN IMAGES OF HUMANS

CROSS REFERENCE TO RELATED APPLICATIONS

Reference is made to commonly assigned, co-pending U.S. patent application Ser. No. 10/792,079, filed Mar. 3, 2004, entitled: CORRECTION OF REDEYE DEFECTS IN IMAGES OF HUMANS", in the name(s) of Andrew C. Gallagher and Jay S. Schildkraut.

FIELD OF THE INVENTION

The invention relates to image processing and more particularly relates to detection of human irises and pupils, especially for correction of redeye defects in images of humans having redeye.

BACKGROUND OF THE INVENTION

Numerous digital image processing procedures, such as identification of persons in digital photographs and redeye correction procedures, find human eyes in digital images. In many of these procedures, the located position of human eyes is approximate. This is suitable for some purposes, but deleterious for others.

Redeye correction can be improved by accurate determination of eye locations. The term "redeye" refers to red light from flash illumination that is reflected off the eye retina of a human subject and back out through the pupil to the camera. Redeye is commonly a problem in cameras that have a flash unit located close to the taking lens. In a digital image, a "redeye defect" is a cluster of one or more pixels that exhibit the red coloration characteristic of redeye. A "redeye defect pair" is a pair of clusters within a digital image that can be classified, based upon such characteristics as relative sizes and locations, as representing light from a right eye and a left eye of the same person.

Many algorithms have been proposed to correct redeye, with the goal of generating an improved image, in which the pupils appear natural. In those algorithms, image pixels that need to undergo color modification are determined along an appropriate color or colors for the modified pixels.

In some redeye correction procedures, redeye is detected manually. An operator moves a cursor to manually indicate to a computer program the redeye portion of a digital image. This approach is effective, but labor-intensive and slow.

Automated detection of redeye pixels can be faster, but it is often the case that the boundary of a redeye defect is not well defined. This is also a problem in a semi-automated approach, in which a user indicates an eye location by setting a single point. When determining redeye defect pixels, it is easy for an algorithm to mistakenly miss pixels that should be considered redeye and/or include pixels that are not really redeye. When coupled with defect correction, these misclassifications can produce objectionable artifacts. An under-correction occurs when some redeye pixels are correctly identified and color corrected, but others are not. As a result, a portion of the human subject's pupil can still appear objectionably red. An over-correction occurs when non-redeye pixels are mistakenly considered redeye, and the color modification is applied. As a result, a non-pupil portion of the human face, such as the eyelid, can be modified by the color correction normally applied to redeye pixels, resulting in a very objectionable artifact.

In correcting redeye pixels, modified pixels are often blended with neighboring pixels of the original image to reduce unnatural harsh edges. For example, in U.S. Published Patent Application Ser. No. 2003/0007687A1 a blending filter is used. If such a blending filter is of uniform size for all human images, then some (typically relatively small) human faces having redeye defects may appear over smoothed, with objectionable blurriness. Other, relatively large human faces may retain harsh edges. A solution to this problem, disclosed in U.S. Published Patent Application Ser. No. 2003/0007687A1, is operator control of the level of blending. This may be effective, but it is another labor-intensive and slow procedure.

In Yuille et al., "Feature Extraction from Faces Using Deformable Templates," *Int. Journal of Comp. Vis.*, Vol. 8, Iss. 2, 1992, pp. 99-111, the authors describe a method of using energy minimization with template matching for locating the eye and iris/sclera boundary.

In Kawaguchi et al, "Detection of the Eyes from Human Faces by Hough Transform and Separability Filter", *ICIP 2000 Proceedings*, pp. 49-52, the authors describe a method of detecting the iris sclera boundary in images containing a single close-up of a human face.

U.S. Pat. No. 6,252,976 and U.S. Pat. No. 6,292,574 discloses methods for detecting red eye defects, in which skin colored regions of a digital image are searched for pixels with color characteristics of red eye defects to determine eye locations.

U.S. Pat. No. 6,134,339 discloses a method, in which pixel coordinates of red eye defects are analyzed for spacing and spatial structure to determine plausible eye locations. Template matching is used.

The above approaches tend to have limited applicability or place large demands on processing resources.

Algorithms for finding shapes are known. The Hough transform method is described in U.S. Pat. No. 3,069,654. Kimme et al., "Finding Circles by an Array of Accumulators," *Communications of the ACM*, Vol. 18, No. 2, February, 1975, pp. 120-122, describes an efficient method for determining circles from an array of edge magnitudes and orientations. A RANSAC fitting routine is described in Hartley and Zisserman, *Multiple View Geometry,* 2000, pp. 101-107.

It would thus be desirable to provide eye detection methods and systems, in which iris boundaries can be detected with relatively good efficiency and moderate computing resources. It would further be desirable to provide eye detection methods and systems, in which redeye defects can be used, but are not mandatory.

SUMMARY OF THE INVENTION

The invention is defined by the claims. The invention, in broader aspects, provides an eye detection method, in which a plurality of candidate eyes are located within a digital image. Pixels of interest having a predetermined characteristic and a predetermined association to respective eyes are found. Pixels of interest associated with each eye are grouped. Parametric boundaries are fit on each of the groups to define a plurality of detected eye features. The boundaries have a predefined uniform shape and a size matched to a respective group. Each of the detected eye features is scored as to a geometric relationship between the respective boundary and pixels of interest associated with the respective eye to provide eye feature scores.

It is an advantageous effect of the invention that an improved eye detection methods and systems are provided, in which iris boundaries can be detected with relatively good efficient and moderate computing resources. It is a further advantageous effect of the invention that an improved eye detection methods and systems are provided, in which redeye defect information is usable, but not mandatory.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying Figures wherein.

DETAILED DESCRIPTION OF THE INVENTION

In the following eye detection methods, eye features are detected in a digital image. The eye features are iris-sclera borders or pupil-iris borders or both. For convenience, the following discussion is directed primarily to detection of iris-sclera borders. It will be understood that pupil-iris borders can be detected in a comparable manner and that both borders can be detected for the same eye, either independently or using the first border detected to limit the possible locations of the second of the two borders.

In the following description, some embodiments of the present invention will be described as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

Figure 4:
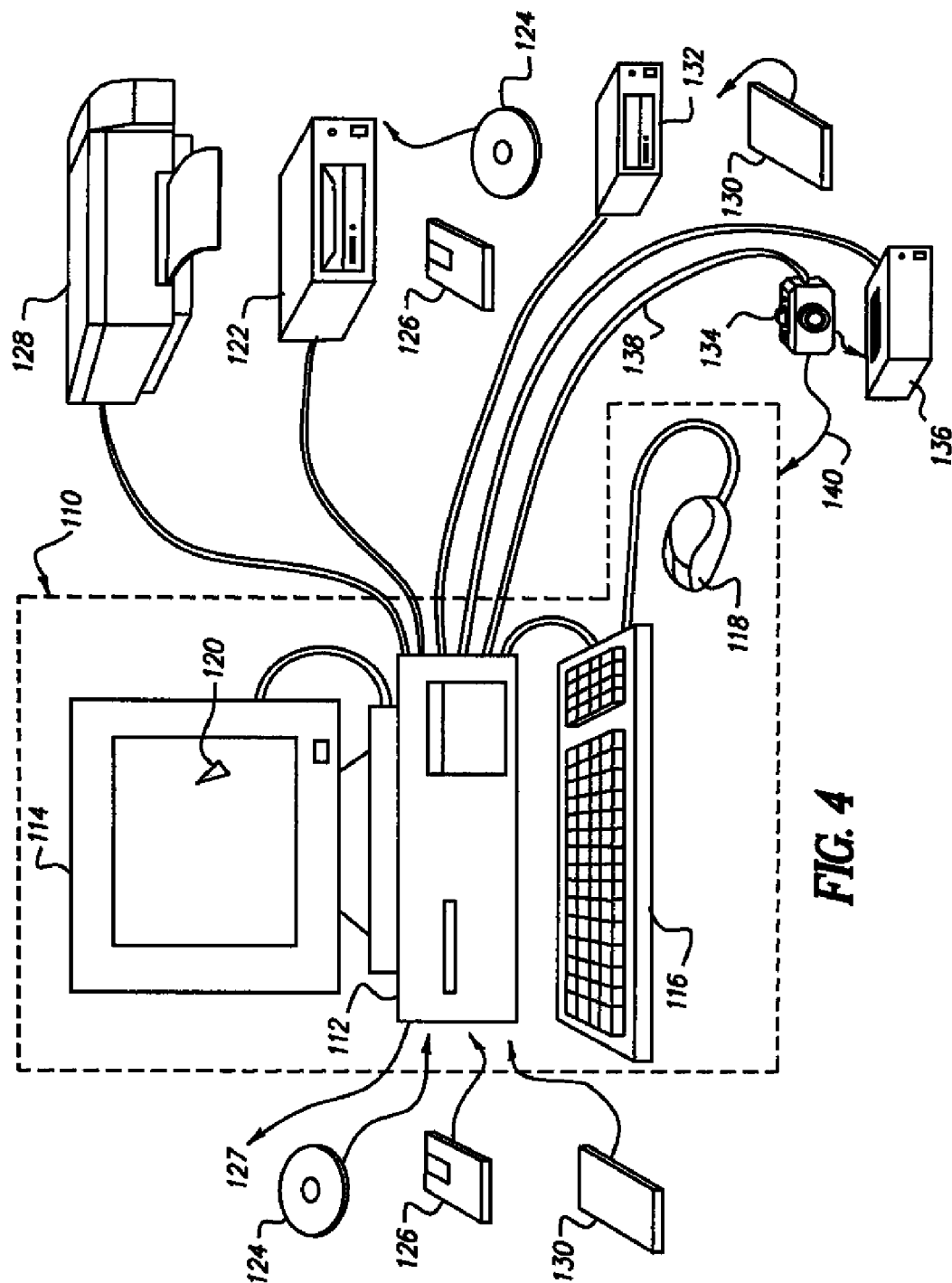
FIG. 4 is a schematic diagram of computer system implementing the method.

The present invention can be implemented in computer hardware and computerized equipment. For example, the method can be performed in a digital camera, a digital printer, and on a personal computer. Referring to FIG. 4, there is illustrated a computer system 110 for implementing the present invention. Although the computer system 110 is shown for the purpose of illustrating a preferred embodiment, the present invention is not limited to the computer system 110 shown, but may be used on any electronic processing system such as found in digital cameras, home computers, kiosks, retail or wholesale photofinishing, or any other system for the processing of digital images. The computer system 110 includes a microprocessor-based unit 112 (also referred to herein as a digital image processor) for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 124, which typically includes software programs, is inserted into the microprocessor based unit for providing a means of inputting the software programs and other information to the microprocessor based unit 112. In addition, a floppy disk 126 may also include a software program, and is inserted into the microprocessor-based unit 112 for inputting the software program. The compact disk-read only memory (CD-ROM) 124 or the floppy disk 126 may alternatively be inserted into externally located disk drive unit 122, which is connected to the microprocessor-based unit 112. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 may also be connected to the microprocessor-based unit 112 for printing a hardcopy of the output from the computer system 110.

Images may also be displayed on the display 114 via a personal computer card (PC card) 130, such as, as it was formerly known, a PCMCIA card (based on the specifications of the Personal Computer Memory Card International Association), which contains digitized images electronically embodied in the card 130. The PC card 130 is ultimately inserted into the microprocessor based unit 112 for permitting visual display of the image on the display 114. Alternatively, the PC card 130 can be inserted into an externally located PC card reader 132 connected to the microprocessor-based unit 112. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera (not shown) or a scanner (not shown). Images may also be input directly from a digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112.

The output device provides a final image that has been subject to transformations. The output device can be a printer or other output device that provides a paper or other hard copy final image. The output device can also be an output device that provides the final image as a digital file. The output device can also include combinations of output, such as a printed image and a digital file on a memory unit, such as a CD or DVD.

The present invention can be used with multiple capture devices that produce digital images. For example, FIG. 2 can represent a digital photofinishing system where the image-capture device is a conventional photographic film camera for capturing a scene on color negative or reversal film, and a film scanner device for scanning the developed image on the film and producing a digital image. The capture device can also be an electronic capture unit (not shown) having an electronic imager, such as a charge-coupled device or CMOS imager. The electronic capture unit can have an analog-to-digital converter/amplifier that receives the signal from the electronic imager, amplifies and converts the signal to digital form, and transmits the image signal to the microprocessor-based unit 112.

The microprocessor-based unit 112 provides the means for processing the digital images to produce pleasing looking images on the intended output device or media. The present invention can be used with a variety of output devices that can include, but are not limited to, a digital photographic printer and soft copy display. The microprocessor-based unit 112 can be used to process digital images to make adjustments for overall brightness, tone scale, image structure, etc. of digital images in a manner such that a pleasing looking image is produced by an image output device. Those skilled in the art will recognize that the present invention is not limited to just these mentioned image processing functions.

A digital image includes one or more digital image channels or color components. Each digital image channel is a two-dimensional array of pixels. Each pixel value relates to the amount of light received by the imaging capture device corresponding to the physical region of pixel. For color imaging applications, a digital image will often consist of red, green, and blue digital image channels. Motion imaging applications can be thought of as a sequence of digital images. Those skilled in the art will recognize that the present invention can be applied to, but is not limited to, a digital image channel for any of the herein-mentioned applications. Although a digital image channel is described as a two dimensional array of pixel values arranged by rows and columns, those skilled in the art will recognize that the present invention can be applied to non rectilinear arrays with equal effect.

Those skilled in the art will also recognize that for digital image processing steps described hereinbelow as replacing original pixel values with processed pixel values is functionally equivalent to describing the same processing steps as generating a new digital image with the processed pixel values while retaining the original pixel values.

The general control computer shown in FIG. 4 can store the present invention as a computer program product having a program stored in a computer readable storage medium, which may include, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device. Before describing the present invention, it facilitates understanding to note that the present invention can be utilized on any well-known computer system, such as a personal computer.

It should also be noted that the present invention can be implemented in a combination of software and/or hardware and is not limited to devices, which are physically connected and/or located within the same physical location. One or more of the devices illustrated in FIG. 4 can be located remotely and can be connected via a network. One or more of the devices can be connected wirelessly, such as by a radio-frequency link, either directly or via a network.

The present invention may be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better—or even just to change them), digital fulfillment (digital images in—from media or over the web, digital processing, with images out—in digital form on media, digital form over the web, or printed on hard-copy prints), kiosks (digital or scanned input, digital processing, digital or hard copy output), mobile devices (e.g., PDA or cell phone that can be used as a processing unit, a display unit, or a unit to give processing instructions), and as a service offered via the World Wide Web.

In each case, the invention may stand alone or may be a component of a larger system solution. Furthermore, human interfaces, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the method of the invention can be fully automatic, may have user input (be fully or partially manual), may have user or operator review to accept/reject the result, or may be assisted by metadata (metadata that may be user supplied, supplied by a measuring device (e.g. in a camera), or determined by an algorithm). Moreover, the algorithm(s) may interface with a variety of workflow user interface schemes.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art.

Figure 1:
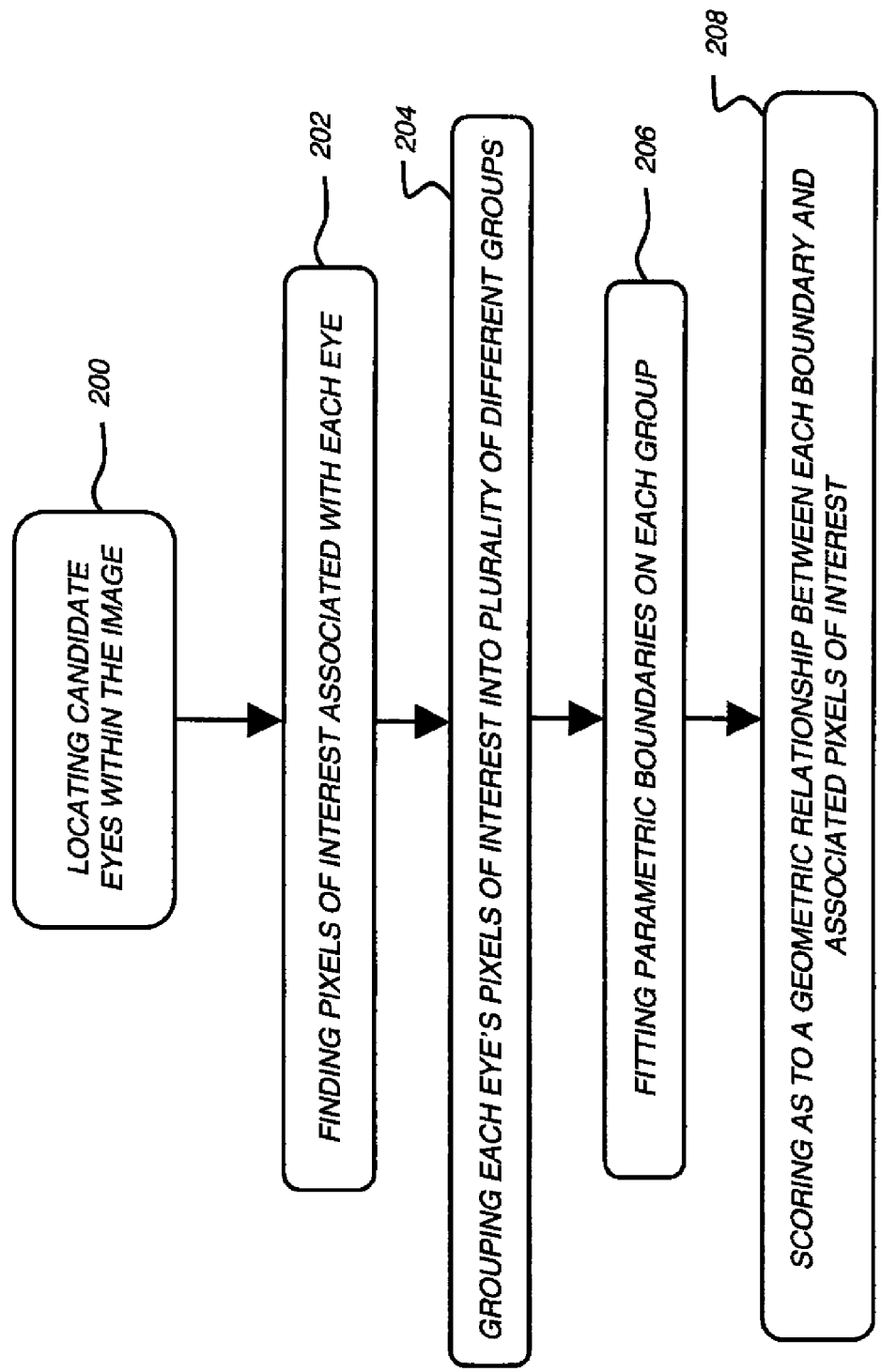
FIG. 1 is a flow chart of the method.
Figure 2:
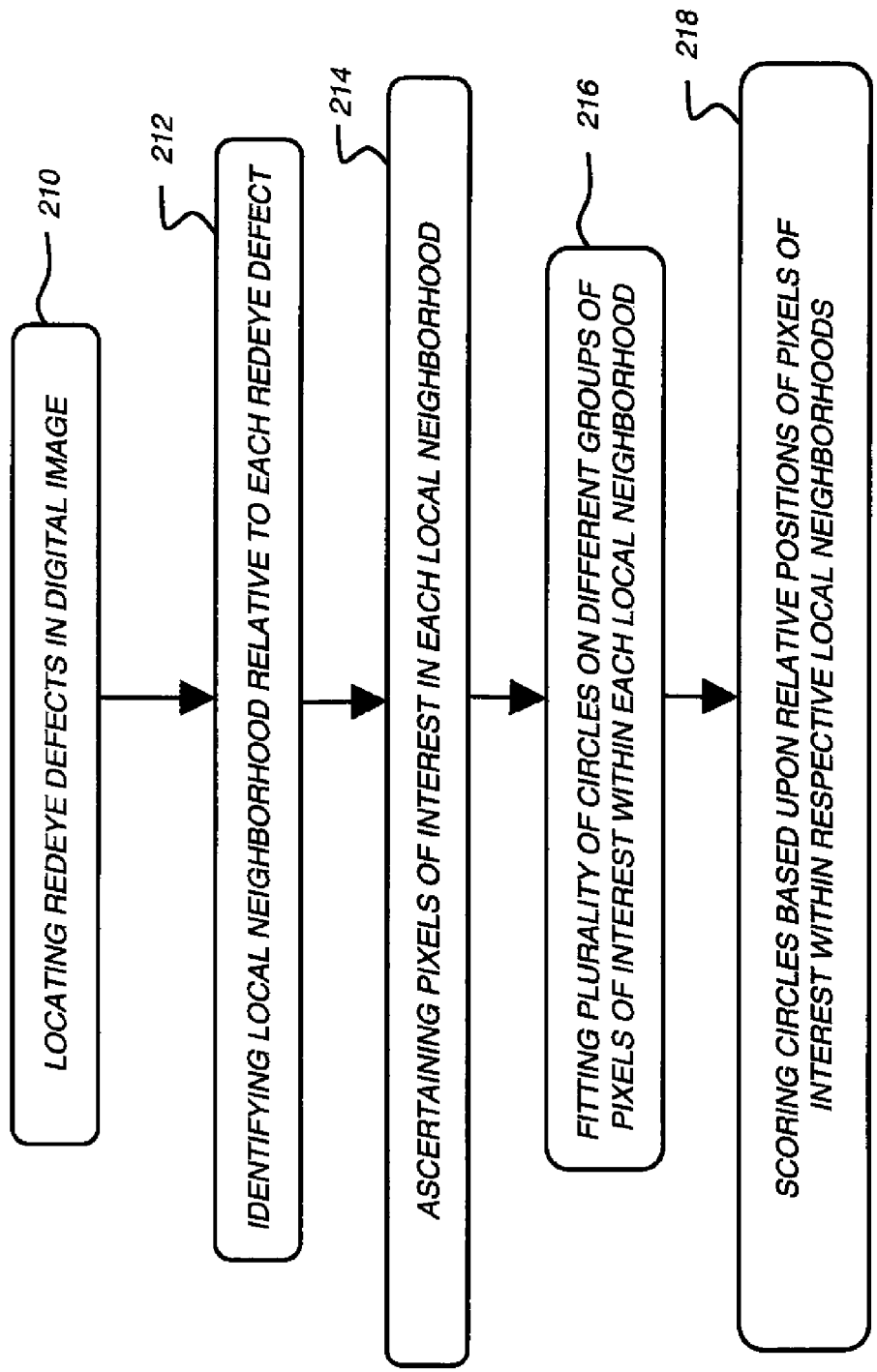
FIG. 2 is a more detailed flow chart of an embodiment of the method of FIG. 1.
Figure 3:
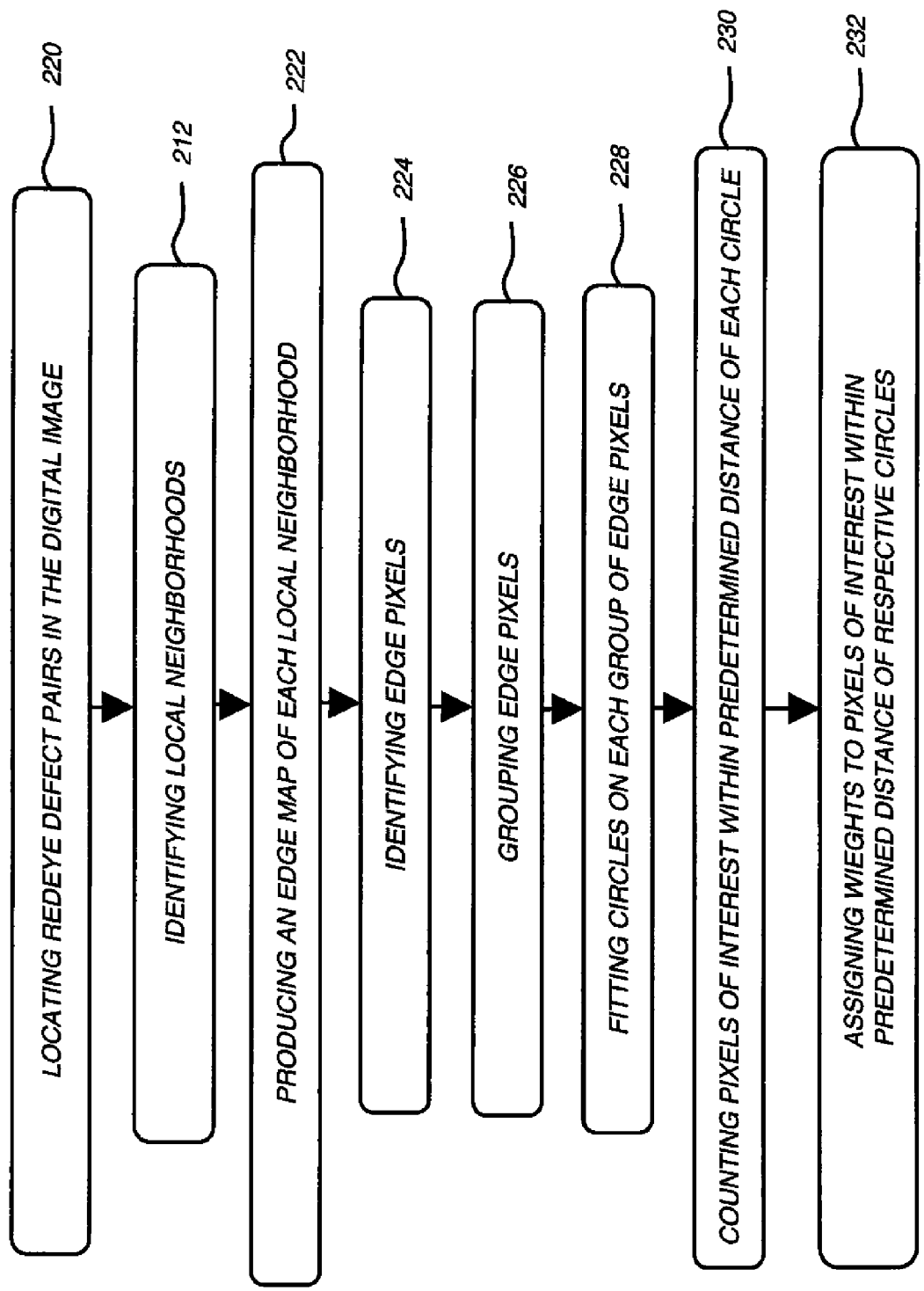
FIG. 3 is a more detailed flow chart of a modification of the embodiment of FIG. 2.

Referring now to FIGS. 1-3, in the methods, one or more pair of candidate eyes are located (200) within a digital image. Pixels of interest associated with each of the eyes are then found (202). The pixels of interest for each eye are grouped (204) into a plurality of different groups. Parametric boundaries are fitted (206) on each of the groups. Each of the boundaries is scored (208) as to a geometric relationship between the respective boundary and the associated pixels of interest. The parametric boundary with the highest ranked score is selected as most closely representing the detected eye feature.

The detected eye feature can be used in later procedures. For example, the location of an iris-sclera boundary can be used to identify pixels outside the boundary, which had been identified as part of a redeye defect. Those outside pixels can then be treated as non-redeye pixels.

A "candidate eye", as the term is used herein, is a cluster of one or more pixels in the digital image that are identified as representing a human eye. This identification can be made manually, for example, by a user dragging a cursor to each eye and clicking a mouse button. Alternatively, eyes can be located automatically within the digital image. A variety of algorithms are known that identify eyes within images. Many algorithms find candidate eyes by identifying the locations of redeye defects or redeye defect pairs. A candidate eye defined by one of these algorithms can be limited to redeye defect pixels or can include both redeye defect pixels and other pixels, depending upon the algorithm used.

Pixels of interest are pixels that are likely to represent parts of an eye. Each pixel has a predetermined characteristic and a predetermined association to a respective candidate eye. The predetermined characteristic is a property having a value in a predetermined range. The property is related to one or both of color (hue) and texture in the digital image.

The predetermined association can be based upon previously imposed limitations on image content in the images under review. For example, pixels of interest can be limited to a fixed location in an image, subject to limitations on image scale and pose of persons photographed. The predetermined association can also be based upon inclusion within a geometric area defined by operator intervention. An example of the latter is the predetermined association being inclusion within a border drawn by an operator. These approaches are workable, but can be limiting.

Alternatively, the predetermined association can be a location within a local neighborhood that is based upon an automatically determined geometric relationship to particular image content, preferably, the respective candidate eye. A simple example of a predetermined association is all pixels within the respective redeye defect. This approach is simple, but includes too few pixels in some cases. It is preferred that the local neighborhood is inclusive of and larger than the respective candidate eye, if the candidate eye is a redeye defect or is similar in relative size to a redeye defect.

FIG. 2 illustrates particular embodiments, in which the candidate eyes/redeye defects are located (210) and local neighborhoods are identified (212) relative to respective redeye defects. Pixels of interest in each local neighborhood are ascertained (214), and circles are fitted (216) and scored (218).

In particular embodiments discussed herein, the predetermined association to a respective candidate eye is inclusion within a local neighborhood relative to a particular pair of eyes (right and left eyes of the same person). In particular embodiments, the local neighborhood is inclusive of and larger than a respective redeye defect. In some embodiments, the size of local neighborhoods is a function of the separation of members of respective pairs of candidate eyes or respective pairs of redeye defects.

The predetermined characteristic can be the same as or closely related to features controlling the predetermined association. An example of this is a predetermined characteristic of pixels exhibiting redeye. Clusters of these pixels can also provide the predetermined association. This approach is practical, but has a greater risk of errors than if the predetermined characteristic is unrelated or less closely related to the features controlling the predetermined association. In the latter approach, the method includes, as a separate and additional step, identifying pixels having the predetermined characteristic. This can be accomplished by producing a map of values of the predetermined property for each of the local neighborhoods and identifying positions on each map having values in a predefined range. Currently preferred properties are color values, color adjacency values, edges values, and combinations of one or more of these. Color values can be derived from multiple color channels or a single color channel. Color adjacency values can be computed using the color values of adjacent or nearly adjacent pixels. For example, one color adjacency value for two neighboring pixels where each pixel has three color channels (red, green, blue) is computed by considering the color channel values as a 3-dimensional vector. The color adjacency value is computed as the Euclidean distance between the two neighboring pixel values in the 3-dimensional space. A further discussion of color adjacency values is disclosed in I. Park, et al., "Color Image Retrieval Using Hybrid Graph Representation," *Image and Vision Computing*, Elsevier, (1999), 17(7) pages 465-474. Edge values or edge maps can be calculated with digital image processing techniques such as the well-known Canny edge detector, application of the Prewitt operator, or application of the Sobel operator. In a particular embodiment discussed in greater detail below, an edge map of each of the local neighborhoods is produced and pixels of interest are identified at the positions on the edge maps having an edge magnitude greater than a predefined threshold.

Pixels having the predetermined characteristic and predetermined association with each eye are grouped and parametric boundaries are fitted on each group. The parametric boundaries have shapes characteristic of eye features. The parametric boundaries can be defined by a polynomial, such as boundaries in the form of parabolas, ellipses, or circles.

The parametric boundaries for each candidate eye or pair of candidate eyes can be scaled relative to the size of the respective eye or pair of eyes. In particular embodiments, the size of local neighborhoods is a function of the size of the respective pair of candidate eyes (e.g., the separation of the two candidate eyes of the pair) and the ranges of sizes of the parametric boundaries are each correlated with the size of a respective local neighborhood.

The number of groups associated with each eye is relatively large and the number of pixels of interest in each group is small. For easier computation, it is preferred that the number of pixels of interest in each group is uniform. In particular embodiments, the groups each have a number of pixels minimally sufficient to define the geometric shape of a respective parametric boundary. For example, if the parametric boundary is a circle, then the minimally required number of pixels of interest in a group is three or, with directional information, two. (Fitting circles to two pixels using respective edge orientation information is discussed below.)

Each boundary is scored. Scoring is a function of the separations of pixels of interest from respective boundaries. In embodiments in which local neighborhoods are determined, boundaries can be located fully within a respective local neighborhood or can extend partway out. Pixels of interest as to a particular eye are located within the respective local neighborhood. In particular embodiments, the scoring is a count of pixels of interest within a predetermined distance of a respective boundary.

The contribution due to each pixel of interest can be weighted or otherwise adjusted. In particular embodiments, pixels from sides of an eye ("lateral pixels") are weighted differently than pixels from the top or bottom ("longitudinal pixels") based on the effect of other facial features, such as eyelids, on photographed eye shape. Similarly, pixels beyond a boundary can be adjusted differently than those within the boundary.

Scoring determines an applicable circle or other parametric boundary for a particular eye. Since numerical values can be chosen to associate a highest or lowest score with the parametric boundary of best match, the term "highest rank" and like terms are used to define a best match.

In the embodiment illustrated in FIG. 3, redeye defect pairs are located (220), local neighborhoods are identified (212), an edge map is produced for each local neighborhood (222), edge pixels are identified from the edge map (224) and grouped (226), circles are fit (228) on each of the groups, pixels of interest within a predetermined distance from respective circles are counted (230) and weighted (232).

Figure 5:
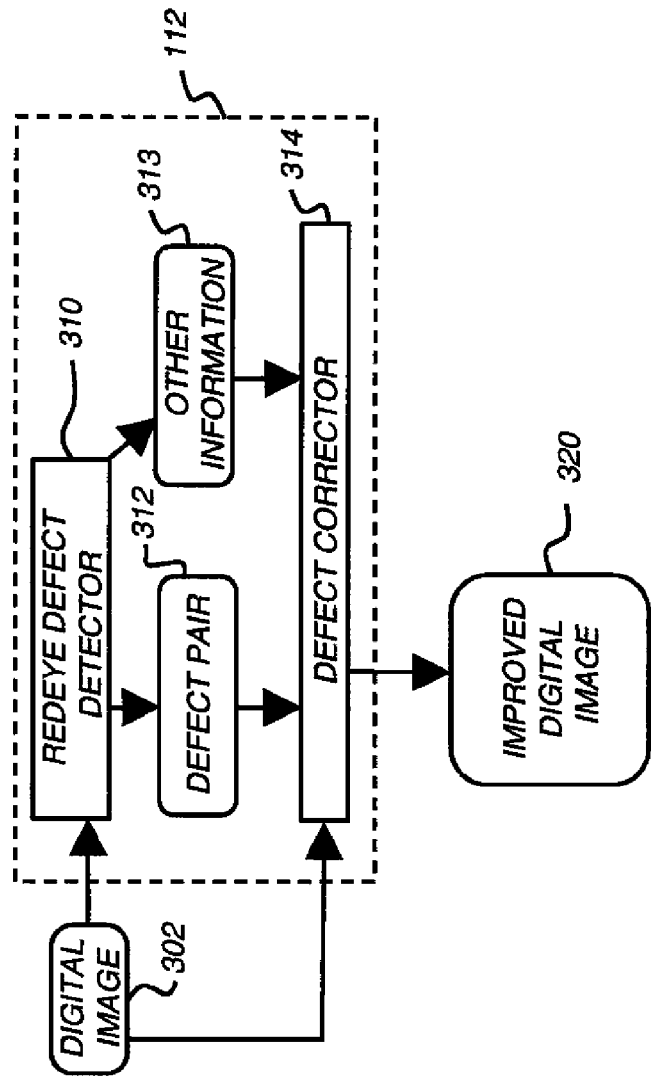
FIG. 5 is a schematic view of the digital image processor of the system of FIG. 4.

Referring now to FIGS. 4-5, the digital image processor 112 is programmed to perform the method of the present invention. An original digital image 302 can be received from the image capture device (shown in FIG. 4) in a variety of different color representations. However, the most typical implementation of the present invention receives the original digital image as a color digital image with red, green, and blue digital image channels. Preferably, the pixel values of the original digital image are related to video-ready code values, that is, the sRGB color space. Preferably, each pixel value of each color channel is represented as an 8-bit value 0 to 255. The present invention can operate successfully with other encodings, although modification to equation constants and shapes of functions may be required.

The digital image 302 is input to the digital image processor 112 for redeye detection and correction. FIG. 5 is a block diagram of the digital image processor 112. The digital image 302 is input to the redeye defect corrector 310 for detection of the objectionable redeye defect. The output of the redeye defect detector is a defect position pair 312 for each detected redeye defect pair (i.e. pair of human left and right eye defects) in the digital image 302. For a given image, the redeye defector detector may be used to detect 0, 1, or multiple defect pairs 312. The redeye defect detector 310 can be any method known in the art. The preferred redeye defect detector 310 is described by Schildkraut et al. in U.S. Pat. No. 6,292,574 B 1. Briefly summarized, in analyzing an image, skin regions are identified based on color and shape and resized for analysis. Each skin region is searched for pairs of small red candidate defects. Various scores are analyzed (e.g. symmetry, score with respect to matching an eye template, etc.) and a final classification is performed indicating the position of likely redeye pairs in an image. Note that the redeye defect detector 310 can internally scale the size of the digital image 302 by interpolation to normalize the analysis image size or to normalize the size of faces or skin regions in the image, for example. In summary, the redeye defect detector 310 finds groups of pixels in the image that it believes represent human pupils with a red appearance. The redeye defect detector 310 finds the defects based on color, shape, and related features. However, as with all statistical classification processes, these features sometimes result in the redeye defect detector 310 making mistakes resulting in a defect that:

is actually either the inside or outside corner of the eye
includes both the pupil AND the iris pixels (this occurs especially for people with brown or hazel eyes)
includes the pupil and a portion of the eyelid or other skin surrounding the eye.

When correction of the defects 312 is performed, defects having mistakes such as those described above can result in artifacts that consumers find objectionable.

Each defect position pair 312 includes at least two pixels (one for each of the left and right eyes) of the digital image 302 affected by the redeye defect. Specifically, each defect is a set of pixels believed by the redeye defect detector 310 to be pixels representing a human pupil with an unnatural reddish appearance caused by flash reflection. One defect of the pair corresponds to the left eye of a human affected by the redeye defect, and the other defect corresponds to the right eye. The defect position pair 312 may be in the form of an image map where pixels determined by the redeye defect detector 310 to be affected by redeye defect are assigned a different value than other pixels. The defect position pair 312 can also be a list of pixels ((x,y) coordinate locations and possibly pixel color values) included in the redeye defect.

The defect position pair 312 is input to the defect corrector 314, along with the digital image 302 and other information 313 from the redeye defect detector 310. The defect corrector 314 determines pixels in the digital image 302 to modify, based on the defect position pair 312. The defect corrector 314 modifies the colors of the determined pixels to reduce the visibility of the redeye defect and outputs an improved digital image 320.

Figure 6:
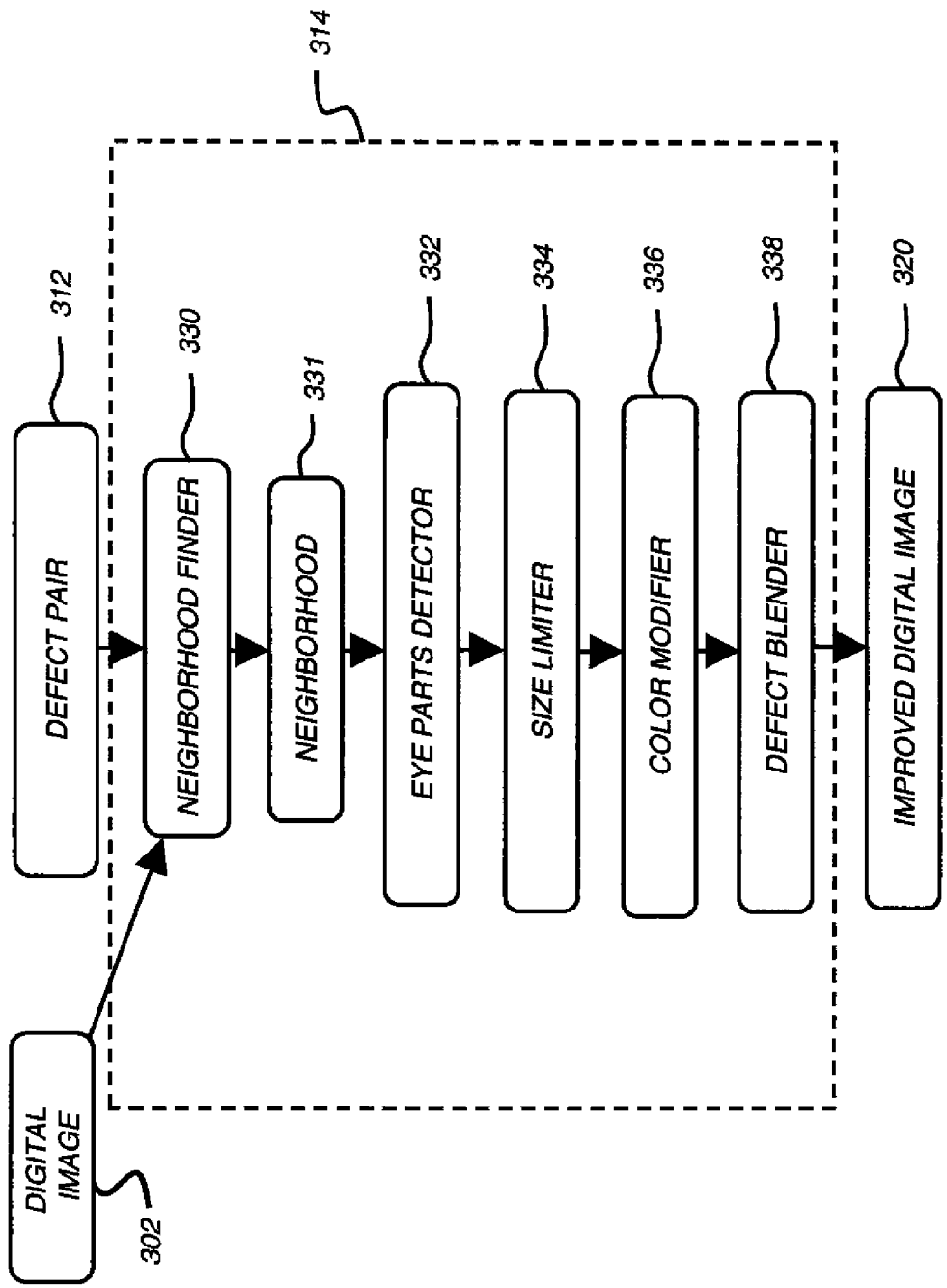
FIG. 6 is a more detailed schematic of the defect corrector of FIG. 5.

FIG. 6 shows the defect corrector 314 in more detail. The operation of the defect corrector 314 is similar with respect to each defect of the pair. The defect position pair 312 and the digital image 302 are input to the neighborhood finder 330. The purpose of the neighborhood finder 330 is to determine a neighborhood 331 around the defect position pair 312 that should be searched for iris and pupil shapes. Preferably, the neighborhood 331 is rectangular (and oriented with sides parallel to the digital image 302) and is determined based on the fact that when a defect position pair 312 contains a mistake, it has often detected the inside or outside corner of one or both eyes. Preferably, the neighborhood is determined by computing the following:

Vector: $D = D1 - D0$

Point: $B1 = D0 + b_0 D$

Point: $B2 = D0 + b_1 D$

Point: $B3 = D0 + b_2 D_{perp}$

Point: $B4 = D0 - b_2 D_{perp}$ where:
D0 is the (x,y) position of the first defect.
D1 is the (x,y) position of the second defect.
D is the vector from D0 to D1.

$D_{perp}$ is a vector extending through D0, of the same length as D, but perpendicular to it.

$b_0$ is a coefficient. Preferably 0.35.

$b_1$ is a coefficient. Preferably −0.51.

$b_2$ is a coefficient. Preferably 0.2.

Figure 7:
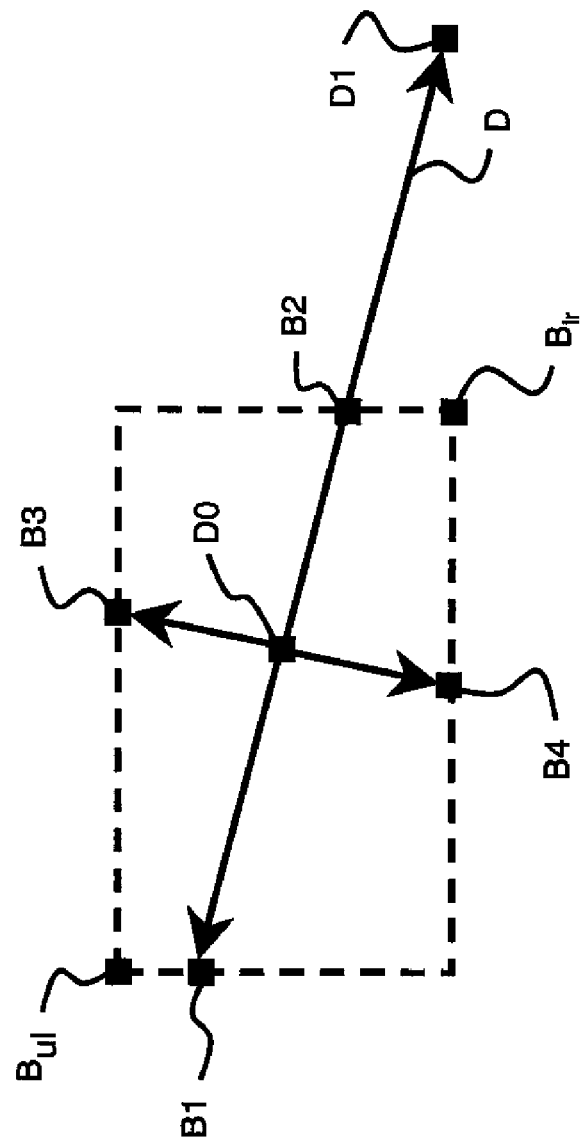
FIG. 7 is a diagram of one of the local neighborhoods identified by the neighborhood finder of FIG. 6.

The upper left corner $B_{ul}$ of the neighborhood has coordinates $(x_{ul}, y_{ul})$. Coordinates $x_{ul}$ and $y_{ul}$ are determined by finding the minimum of the x and y coordinates, respectively, of points B1, B2, B3, and B4. Similarly, the lower right corner $B_{lr}$ of the neighborhood has coordinates $(x_{lr}, y_{lr})$. Coordinates $x_{lr}$ and $y_{lr}$ are determined by finding the minimum of the x and y coordinates, respectively, of points B1, B2, B3, and B4 FIG. 7 illustrates the points D0, D1, B1, B2, B3, and B4, $B_{ul}$, $B_{lr}$, and the neighborhood for the defect D0 is shown with a dashed line.

It is easy to see that the size of the neighborhood 331 depends on the distance between the defects of the defect pair 312 and the coefficients $b_0$, $b_1$, and $b_2$. The selection of the parameters $b_0$, $b_1$, and $b_2$ may be influenced by the age of the human subject or the out-of-plane rotation of the human subject's head relative to the subject plane of the image.

Next, the neighborhood is passed to the eye parts detector 332 for detection of the anatomical regions of the iris and pupil. As used herein, the detection of the iris refers to the detection of the boundary between the iris and the sclera and the detection of the pupil refers to the detection of the boundary between the iris and the pupil.

Figure 8:
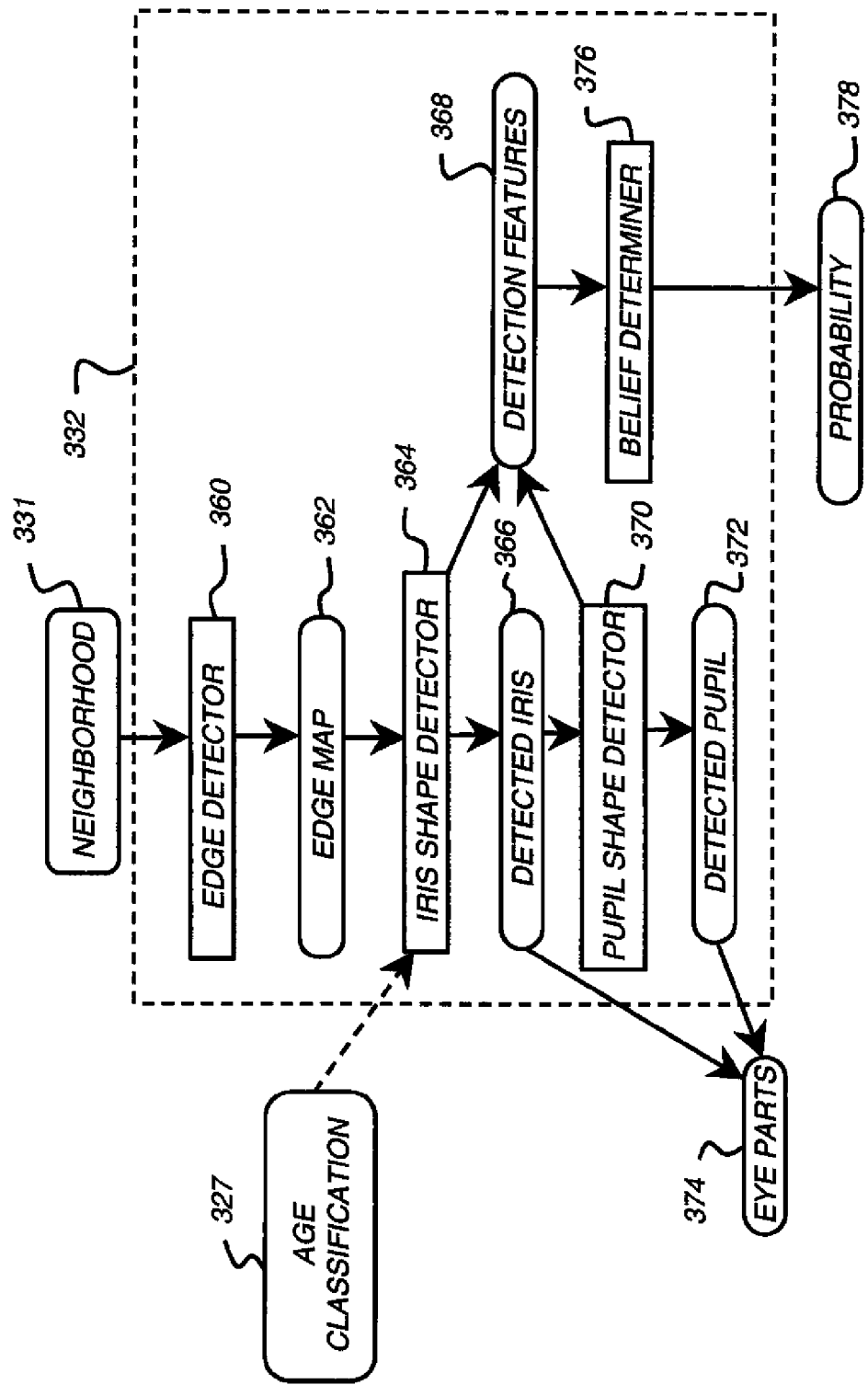
FIG. 8 is more detailed schematic of the eye parts detector of FIG. 6.

The eye parts detector 332 is shown in more detail in FIG. 8. An edge detector 360 is applied to the neighborhood 331 output from the neighborhood finder 330. In a particular embodiment, only the red channel is passed to the edge detector 360. Those skilled in the art will recognize that other color channels (e.g. green or blue) or combinations of color channels (e.g. a luminance channel or chrominance channel) can be used instead of the red channel. Many edge detectors are known in the art, for instance the well-known Canny, Sobel, and Prewitt edge detectors can all be used to detect edges in the neighborhood. The edge detector 360 produces an edge map 362 of the neighborhood for further analysis. In a particular embodiment, the Sobel operator is used to create an edge map 362 that indicates both the magnitude and orientation of edges at each position in the neighborhood.

Edge pixels are identified as those positions in the edge map 362 having an edge magnitude greater than a threshold T0. For example, T0 may be dynamically selected such that at least 2% of the pixels in the edge map have an edge magnitude greater than T0, and are thus considered edge pixels. In a particular embodiment, T0 is 28.

The edge map is passed to the iris shape detector 364 for detection of the iris shape. (I.e. the curve forming the boundary between the iris and the sclera.) This shape is generally modeled as a curve or polynomial on the image coordinates. The iris/sclera boundary forms a circle that is projected to form a curve on the image plane when the image is captured. The iris/sclera boundary can be aligned with the image plane or in an out-of-plane rotation relative to the image plane. An ellipse can be used to fit the curve, but an ellipse has five free parameters and is difficult to fit. The difficulty arises, because often only a small portion of the boundary between the iris and the sclera is visible. Generally, most of the iris/sclera boundary is covered by the upper and/or lower eyelids. It is not at all uncommon for a person to be looking out of the corner of his/her eye so that only a small portion of the iris/sclera boundary is visible (e.g. arc of less than $\pi/6$ radians). In such cases, it is very difficult to control the fitting of the parameters as many quite different ellipses fit the edge with nearly equivalent performance.

It has been observed that most photographs of people (especially when the redeye defect is present) occur in images of people facing the camera. For this reason, a circle almost always provides a good fit for the boundary between the iris and sclera. There are only three free parameters and the parameters can be robustly determined.

In a particular embodiment, the iris shape detector 364 searches the edge map 362 for circular shapes that might be a human iris. The detection of the circular iris shape from the edge map can be accomplished by many different methods. For example, in Kimme et al., "Finding Circles by an Array of Accumulators," *Communications of the ACM*, Vol. 18, No. 2, February 1975, pp. 120-122, there is described an efficient method for determining circles from an array of edge magnitudes and orientations. This method is an extension of the well known Hough transform method first described in U.S. Pat. No. 3,069,654. In a particular embodiment, a RANSAC (described by Hartley and Zisserman, *Multiple View Geometry*, 2000, pp. 101-107) fitting routine is employed. In essence, several (2) pixels from the neighborhood are selected. Since the local edge orientation at these two points is known, the maximum likelihood circle can be determined. Then, the edge image is examined to determine a score for that maximum likelihood circle, based on the number of edge pixels that are within a small distance of the circle boundary. The process is repeated many times (or for all pairs of edge pixels) and the circle having the highest associated shape is output as the detected iris 366.

Figure 9:
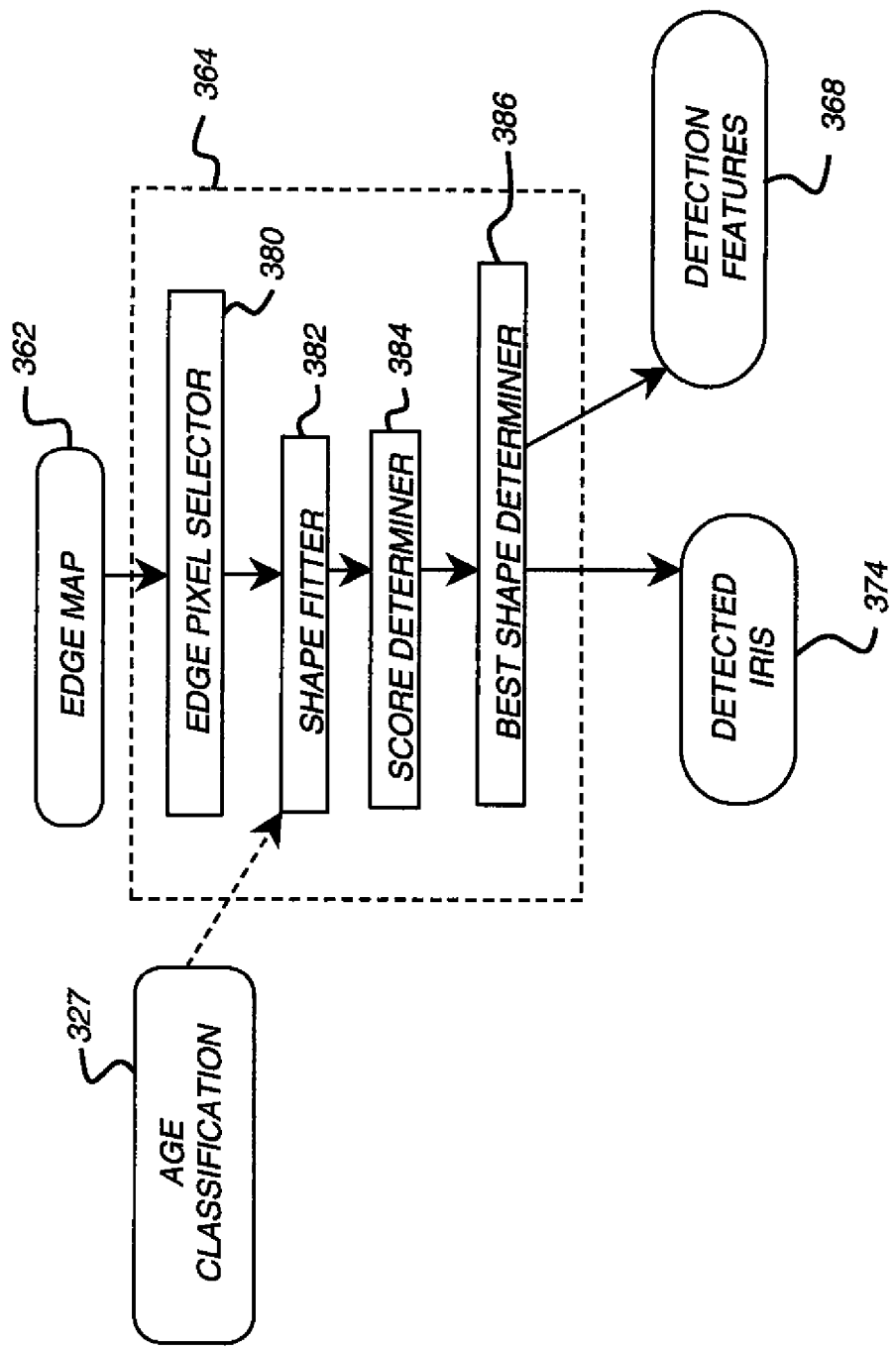
FIG. 9 is more detailed schematic of the iris shape detector of FIG. 8.
Figure 10:
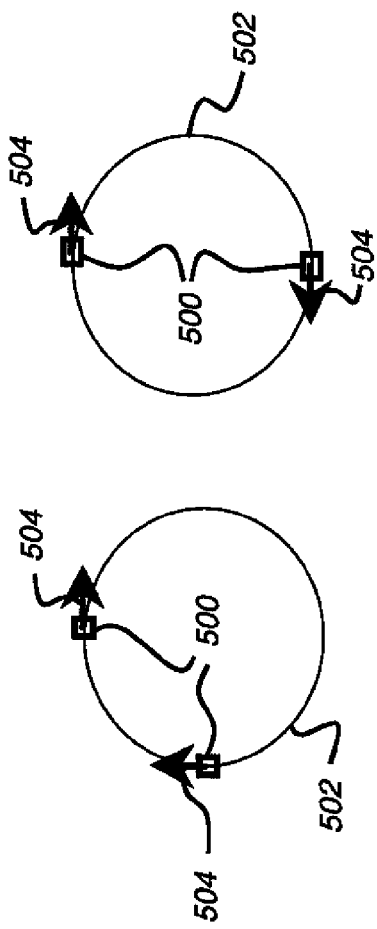
FIG. 10 is a diagram illustrating two pairs of edge pixels selected by the edge pixel selector of FIG. 9 and circles fit on the edge pixels, in accordance with the method. Edge orientations are indicated by arrows.
Figure 11:
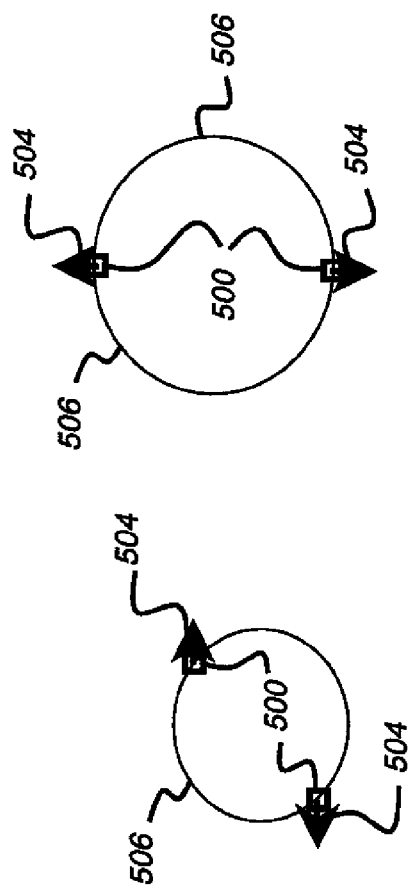
FIG. 11 is the same kind of diagram as FIG. 10, but the pairs of edge pixels are disposed such that circles cannot be fit in accordance with the method. Dashed lines indicate attempts to fit circles. Edge orientations are indicated by arrows.

FIG. 9 shows the iris shape detector 364 in more detail. The edge pixels selector 380 selects a pair of edge pixels and the shape fitter 382 determines the maximum likelihood circle, based on these two edge pixels. For example, FIG. 10 illustrated by showing a number of pairs of edge pixels 500, their edge orientations (indicated by arrows 502), and the determined maximum likelihood circles (504). It often occurs that no circle can be constructed that will pass through the two edge points and have the tangent to the circle at the position of each edge point match (within T1 radians, where preferably T1=$\pi/24$) the required edge orientation, see the examples in FIG. 11. (Examples of unacceptable circles 506 are indicated by dashed lines.) In these cases, the shape fitter 382 reports a failure and the process continues when the edge pixel selector 380 selects a new pair of edge pixels. In some additional cases, the shape fitter 382 will also report a failure. An acceptable iris radius range is defined by a minimum radius $r_{min}$ and a maximum radius $r_{max}$. Preferably $r_{min}=R_n\|D\|+B$, and $r_{max}=R_x\|D\|+B$, where $\|D\|$ is the length of the D vector above, B is imaging system blur, and $R_n$ and $R_x$ are multipliers. In a particular embodiment, B is 2 pixels, $R_n$ is 0.06, and $R_x$ is 0.14. It has been observed that the ratio of iris radius to distance between the eyes is highly dependent on the age of the human subject. The values of $r_{min}$ and $r_{max}$ can be influenced by the age. For example, when the human subject is classified as a child, $R_n$ is preferably 0.09, and $R_x$ is preferably 0.14. When the human subject is classified as an adult, $R_n$ is preferably 0.06, and $R_x$ is preferably 0.12.

As an alternative embodiment, the Hough transform method may be used by the iris shape detector 364 to find the iris/sclera boundary. It is well known that a multiple stage approach can be used. For example, a Hough transform can be used to identify the center of the circle. Then a second Hough transform can be used to identify the radius. Furthermore, those skilled in the art will recognize that there are many possible variations to the iris shape detector 364. For example, edge orientations can be completely ignored if the edge pixel selector 380 selects a trio of points (rather than just two points as described hereinabove) at a time, because of the commonly known fact that three non-linear points determine a unique circle.

The optional age determiner 327 analyzes the image of the human subject's face corresponding to the defect pair, and outputs an age classification that is input to the iris shape detector 364 to be used to determine the values of $r_{min}$ and $r_{max}$. An example of an automatic method of performing age classification of human faces is disclosed in U.S. Pat. No. 5,781,650, to Lobo et al.

When the radius of the maximum likelihood circle either exceeds $r_{max}$ or is smaller than $r_{min}$, the shape fitter 382 reports a failure and the process continues when the edge pixel selector 380 selects a new pair of edge pixels.

The score determiner 384 determines an inclusion score for the maximum likelihood circle output from the shape fitter 382. The score is generated by finding edge pixels of the image that are within a small distance from the maximum likelihood circle's perimeter. In a particular embodiment, distance is 0.7 pixels. Each edge pixel within the distance is assigned a weight based the angle formed by the line joining the edge pixel to the center of the maximum likelihood circle and the line joining the left and right defect of the defect pair 312.

Figure 12:
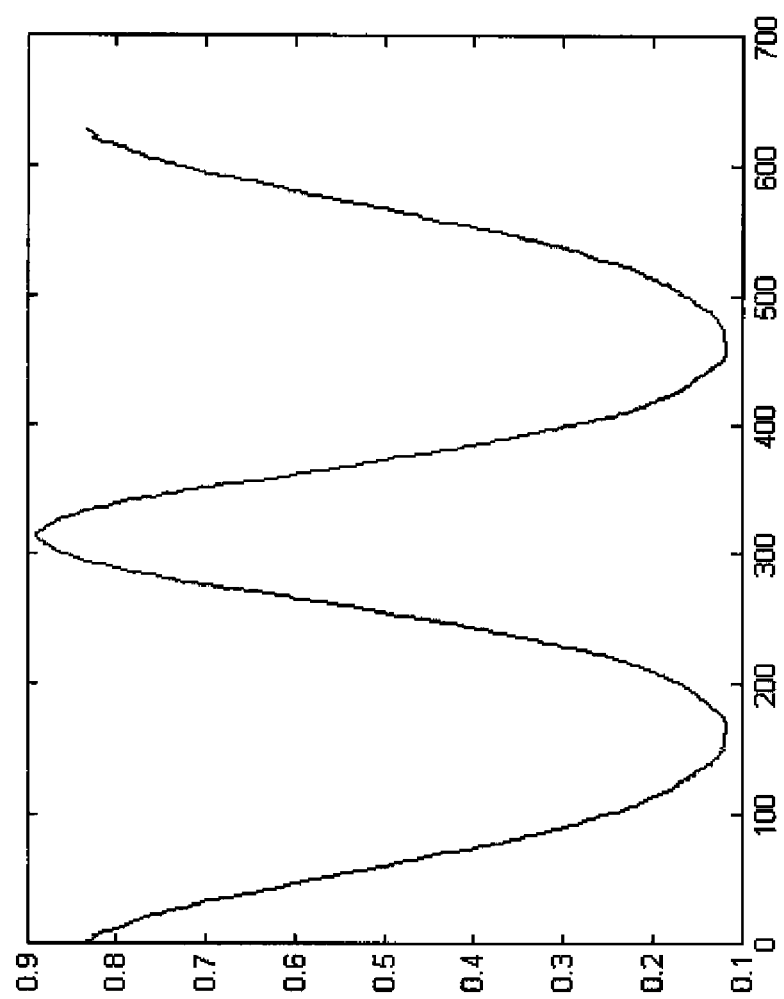
FIG. 12 is diagram of a weighting function applied by the score determiner of FIG. 9. The ordinate is in units of a probability. The abscissa is in units of radians* 100.

Weights are assigned based upon the probability that a given angular portion of the iris/sclera boundary circle is visible. This probability will vary depending upon the nature of the image, for example, casual photography vs. carefully posed portraits. FIG. 12 illustrates a function used to assign the weights in a particular embodiment. The shape of the function was derived by examining hundreds of typical consumer images and determining the probability that a given angular portion of the iris/sclera boundary circle is visible. The variable weights place more importance on edge pixels located on the sides (rather than the top and bottom) of the maximum likelihood circle's perimeter, because it is far more common that these portions of the iris/sclera boundary will be visible in a photograph of a human face. The score for the maximum likelihood circle is the sum of all the weights for all of the edge pixels within a small distance of the maximum likelihood circle's perimeter.

The best shape determiner 386 receives inclusion scores for the different maximum likelihood circles and identifies the detected iris 366 having the maximum likelihood circle with the highest associated score. The iris shape detector 364 outputs a representation of the detected iris 366. Many different types of representation of the detected iris 366 can be used. The simplest is the values of the three parameters that form the circle. The iris shape detector 364 optionally also outputs, as related features 368, the scores associated with the detected iris 366, that can later be used to establish a confidence, probability, or belief that the detected iris 366 does in fact represent a human iris in the image.

Although in this preferred embodiment the boundary between the iris and sclera is detected first, followed by the detection of the pupil/iris boundary, those skilled in the art will recognize that that order may be reversed.

The pupil shape detector 370 then determines a pupil/iris boundary, using knowledge of the detected iris 366. In a particular embodiment, the pupil boundary is assumed a circle having the same center as the detected iris 366. With this approach, the pupil shape detector 370 need only compute the pupil radius, that is, the radius of the pupil/iris boundary. The computation of the pupil radius, $r_{pupil}$ is accomplished as follows:

An error $e(r_{pupil})$ is computed as a function of radius $r_{pupil}$, where $0 <= r_{pupil} <= r_{iris}$ ($r_{iris}$ is the detected iris's radius) according to the following method:

1. Two mean values are computed. A first mean value (the "pupil color mean") is computed for all pixels $<= r_{pupil}$ to the detected iris circle's center. A second mean value (the "iris color mean") is computed for other pixels $<= r_{iris}$ to the detected iris circle's center. So-called glint pixels are ignored by excluding all pixels whose value is greater than T3 (preferably 97%) of the pixels inside the detected iris circle. Pixels are also ignored if a line passing through the center of the circle and the pixel does not pass through or near (e.g. within 1.5 pixels) an edge pixel.
2. For all (non-excluded) pixels, an error is calculated by finding the difference between the pixel value and the appropriate mean value. The first mean value is used for pixels $<= r_{pupil}$ from the iris circle's center. The second mean value is used for pixels $<= r_{iris}$ (but further than $r_{pupil}$) from the iris circle's center.
3. The value of $e(r_{pupil})$ is the standard deviation of the errors computed in step 2.

Figure 13:
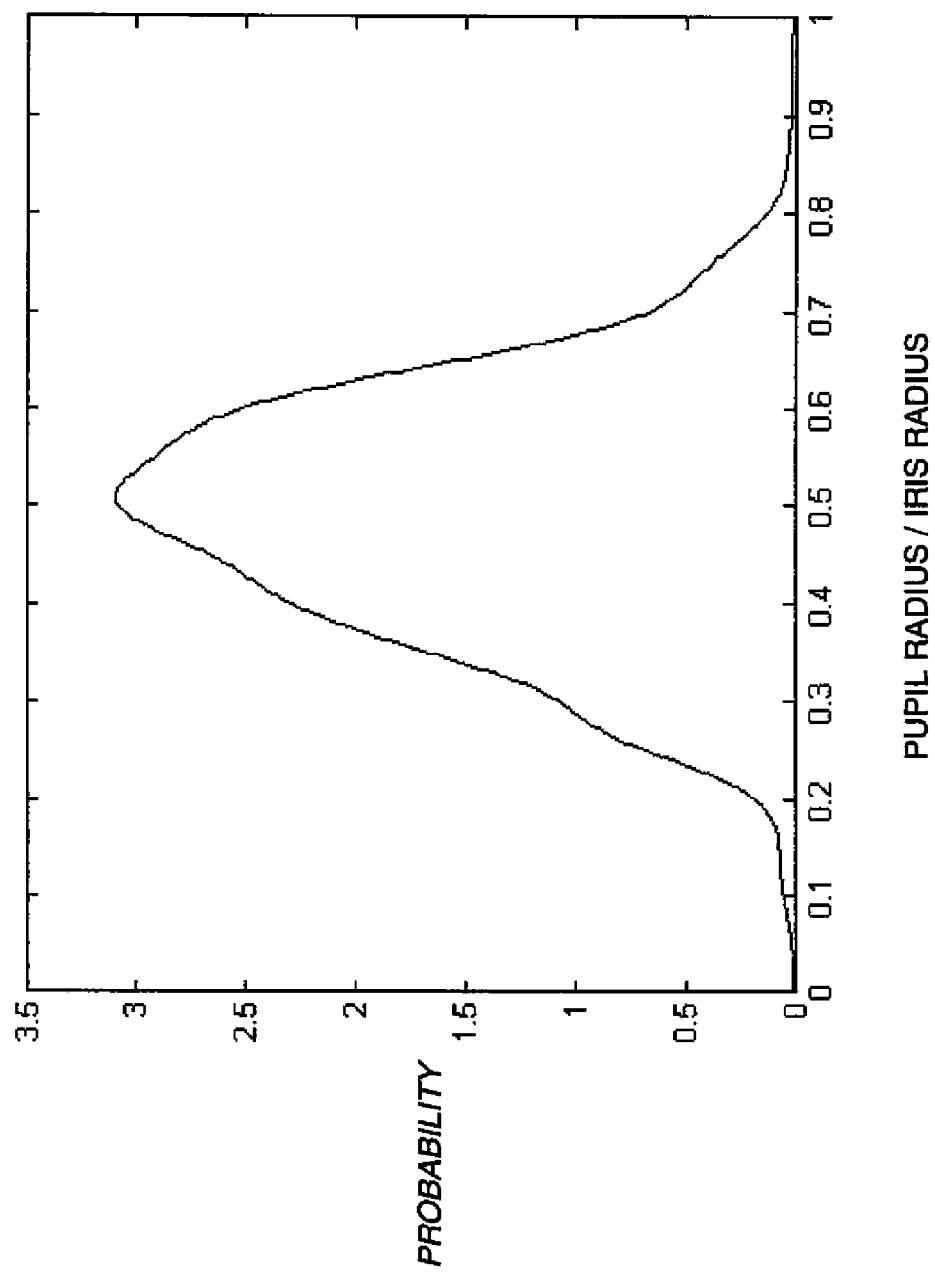
FIG. 13 is a diagram of an empirically determined probability density function of ratio of pupil radius to iris radius usable by the pupil shape detector of FIG. 8.

The $e(r_{pupil})$ function is then weighted by a function related to the probability that a photograph of an eye will have a given ratio between pupil diameter and iris diameter. The pupil radius is then determined by finding the value $r_{pupil}$ associated with the minimum of the $e(r_{pupil})$ function. FIG. 13 shows an example of a suitable probability density function for this purpose that was derived by examining many hundred images containing several thousand human eyes.

The pupil shape detector 370 outputs a detected pupil 372 and optionally outputs, as associated detection features 368, iris color and pupil color that can later be used to establish a confidence, probability, or belief that the detected pupil 372 does in fact represent a human pupil in the image.

The detected iris 366 and detected pupil 372 (referred to collectively as "eye parts 374") are input to the belief determiner 376 for establishing the confidence, probability, or belief that the detected eye parts are accurate and do accurately represent the corresponding eye parts in the digital image 302.

The belief determiner 376 can establish the probability that the detected eye parts 374 of an individual defect of the defect pair 312 are accurate, or it can establish the probability based on detected eye parts 374 of the defect pair 312.

In a particular embodiment, the belief determiner 376 computes a set of defect pair features based on the detected eye parts and the related detection features 368. A first feature, $F_1$, is related to the size difference between the two detected irises and is computed as:

$$F_1 = \frac{\min(R_0, R_1)}{\max(R_0, R_1)}$$

where $R_0$ is the radius of the detected iris associated with the first defect of the defect pair 312 and $R_1$ is the radius of the detected iris associated with the second defect of the defect pair 312.

A second feature, $F_2$, is related to the consistency of the color of those pixels that are inside the detected iris, but outside of the detected pupil; in other words, those pixels that make up the iris itself and correspond to the part of a person's eyes that provides the eye color, such as "blue" or "brown", or "hazel". The difference in the average color of the iris region is computed as follows:

$$F_2 = \sqrt{\sum_{i=0}^{c} (C_{0i} - C_{ni})^2}$$

where:
- c is the number of channels of color information contained in the digital image. (Typically c=3).
- $C_{ni}$ is the value of the iris color for the $(n+1)^{th}$ defect for the $i^{th}$ color channel.

A third feature, $F_3$, is related to the score produced by the iris shape detector 364. This feature is simply the minimum of the scores associated with each of the two detected irises:

$$F_3 = \min(s_0, s_1)$$

Figure 14:
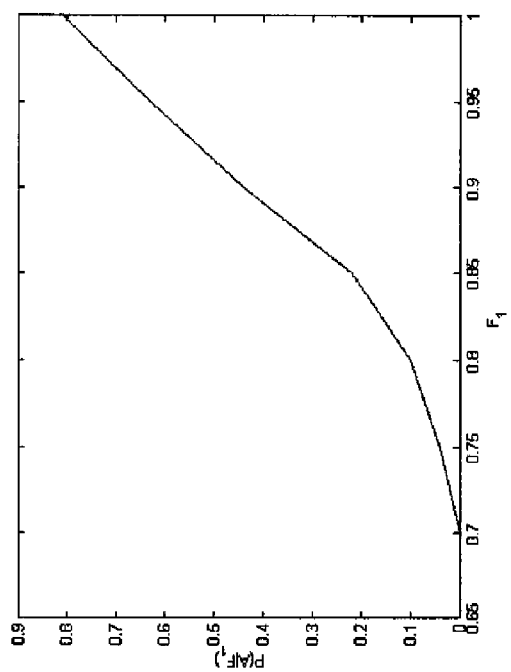
FIG. 14 is a diagram of the probability that a pair of detected eye parts is accurate given empirically determined ratios of size differences between irises of a pair of human eyes. The ordinate is in units of a probability. The abscissa is the value of feature $F_1$.
Figure 15:
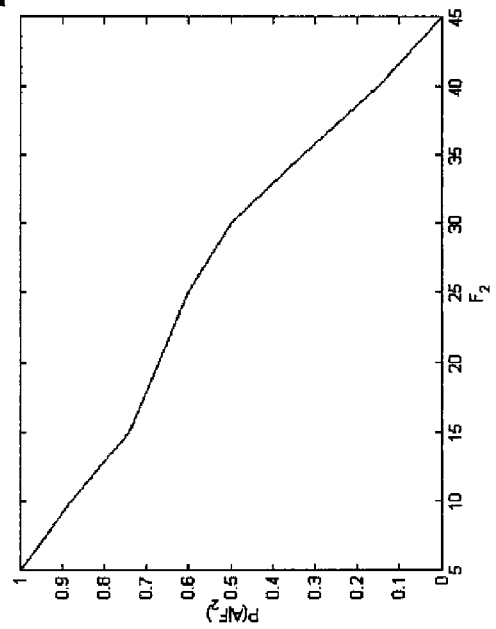
FIG. 15 is a diagram of the probability that a pair of detected eye parts is accurate given empirically determined differences in the average color of the iris region of human eyes. The ordinate is in units of a probability. The abscissa is the value of feature $F_2$.
Figure 16:
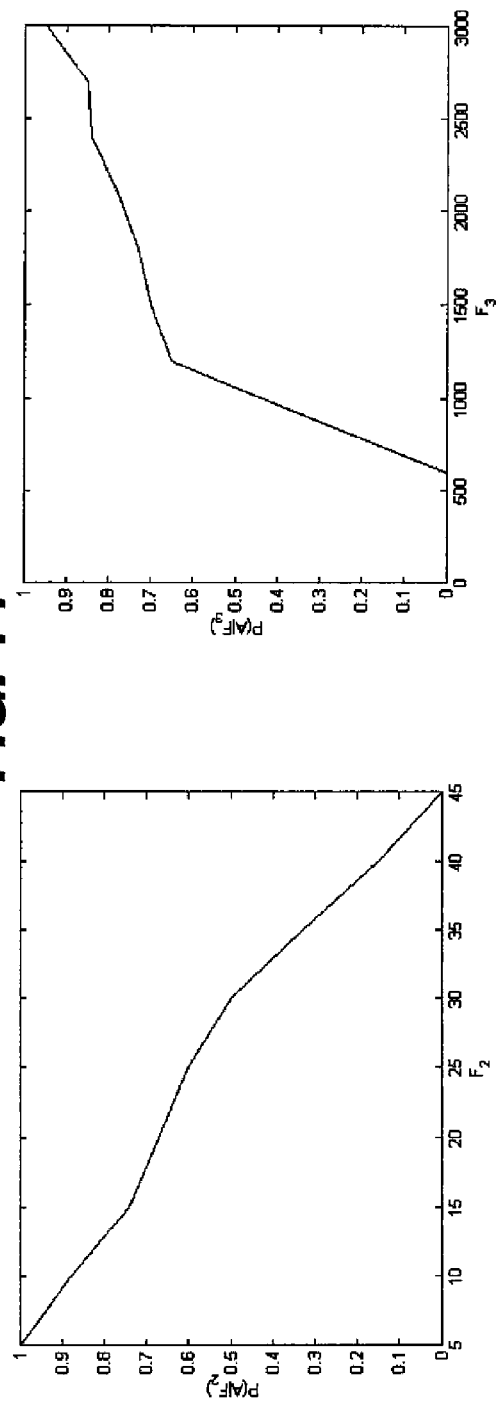
FIG. 16 is a diagram of the probability that a pair of detected eye parts is accurate given empirically determined minimum iris shape detector score associated with a pair of human eyes. The ordinate is in units of a probability. The abscissa is the value of feature $F_3$.

The probabilities associated with various values of the defect pair features was ascertained by analyzing many hundred images containing several thousand human eyes. The probability that the pair of detected eye parts 374 is accurate given $F_1$ is shown in FIG. 14. The probability that the pair of detected eye parts 374 is accurate given $F_2$ is shown in FIG. 15. The probability that the pair of detected eye parts 374 is accurate given $F_3$ is shown in FIG. 16. An overall probability that the pair of detected eye parts is accurate given features $F_1$, $F_2$, and $F_3$ can be computed as:

$$P(A|F_1, F_2, F_3) = (P(F_1)*P(F_2)*P(F_3))^k$$

In a particular embodiment, the value of k is ⅓.

The belief determiner 376 outputs the probability, $P(A|F_1, F_2, F_3)$ (indicated by reference numeral 378 in FIG. 5. Those skilled in the art will readily recognize that although in the preferred embodiment three features are used to establish the probability 378, any number of features could be used.

Referring back to FIG. 6, the size limiter 334 inputs a defect of the defect pair 312, determined eye parts 374, and the associated probabilities and, when necessary, trims the defect by determining pixels of the defect to delete from the defect. In a particular embodiment, the size limiter 334 determines a limiting circle and deletes all pixels from the defect that are outside the limiting circle. The limiting circle is the detected pupil when the associated probability is very high (greater than a limit T4). The limiting circle is the detected iris when the associated probability is moderate (less than T4 and greater than a lower limit T5). The limiting circle is a circle with infinite radius (that is, the modified defect is identical to the original defect) when the associated probability is low (less than T5). If the limiting circle is the detected pupil, then it has been found to be advantageous to enlarge the limiting circle by adding a distance of 1.5 pixels to the radius of the limiting circle before the size limiter 334 uses it for trimming operations. An example of suitable values is T4=0.6 and T5=0.35.

Figure 17:
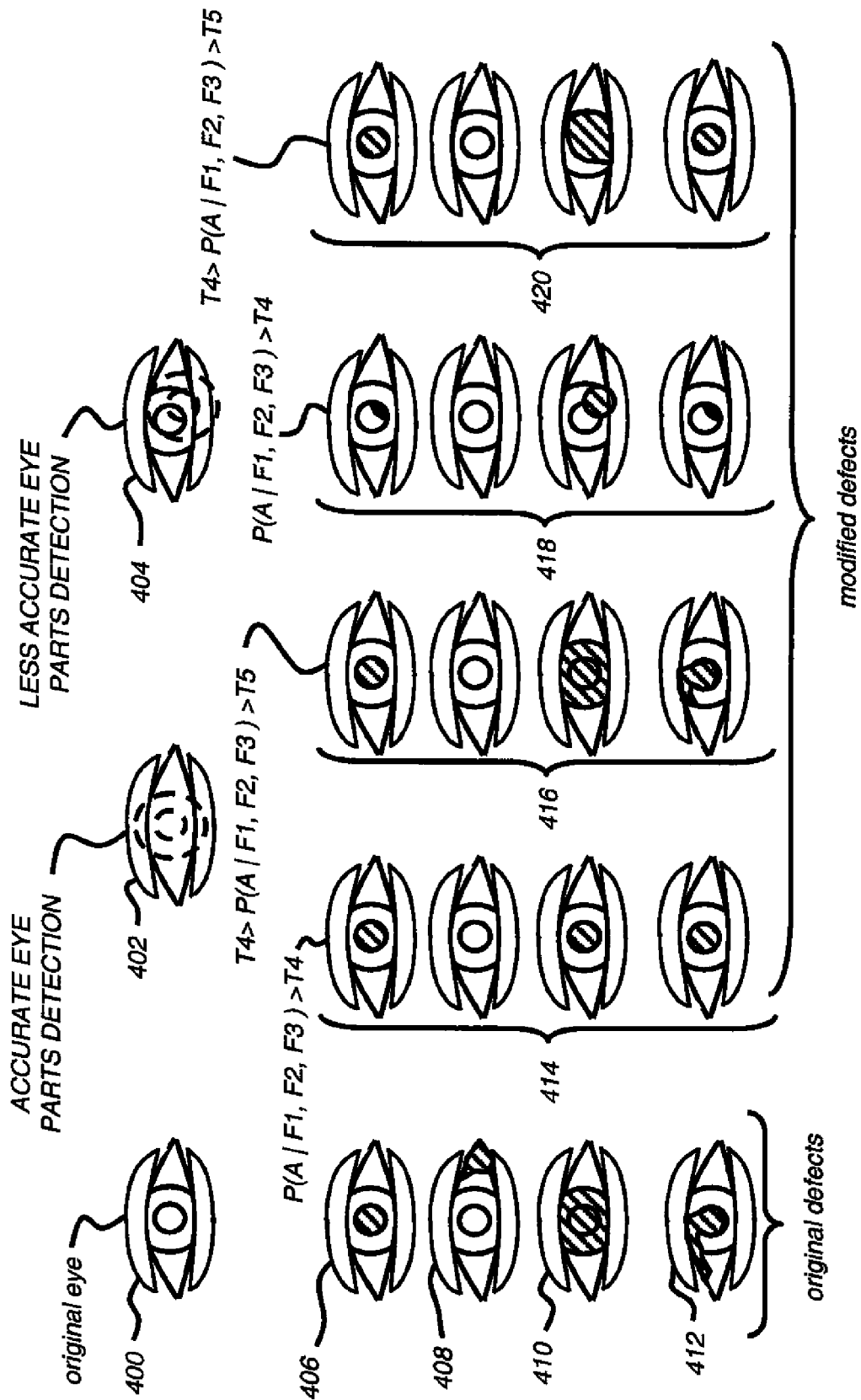
FIG. 17 is a diagram of the effect of the size limiter of FIG. 6 on a defect from a defect pair as a function of the detected eye parts and the associated probability.

FIG. 17 illustrates the effect of the size limiter 334 on a defect from a defect pair 312 as a function of the detected eye parts 374 and the associated probability 378. FIG. 14 shows a set of 23 eyes. The top row shows an original eye 400, the eye with overlaid accurate eye parts detection 402, and the eye with less accurate eye parts detection 404. The detected irises and pupils are shown as dashed lines.

The bottom four eyes of the left column show four hypothetical defects (indicated with hatching) from a defect pair 312. The top defect 406 is the desired correct output from the redeye defect detector 310. The next defect is a false positive where the corner of the eye is mistakenly identified as a defect. Correction of the false positive defect 408 by the color modifier 336 would result in an undesirable dark spot in the corner of the eye (and would leave any redeye pixels in the pupil untouched). In the next, the entire pupil and iris is identified as defect 410. Correction of this overgrown defect by the color modifier 336 would correct any redeye pupil pixels, but the iris pixels would be undesirably darkened and color would be desaturated. In the last original defect, correction of overgrown defect 412 would also result in undesirable darkening of the upper eyelid.

The second column 414 of eyes shows the modified defects when accurate eye parts detection 402 is used by the size limiter 334 to trim defects 406-412 to the pupil as the limiting circle defined by:

$$(P(A|F_1, F_2, F_3) > T4)$$

In each case, a good result is obtained. The false positive defect 408 is entirely removed in the modified defect, because it is located entirely outside of the limiting circle. Therefore, undesirable darkening of the eye corner will not occur.

The third column 416 shows the set of modified defects created when the limiting circle is defined by the detected iris:

$$(T4 > PP(A|F_1, F_2, F_3) > T5)$$

These modified defects corresponding to defects 408 and 412 are improved, but the improvement overall is less than in the second column.

The fourth and fifth columns 418, 420 show the modified defects that result for $(P(A|F_1, F_2, F_3) > T4)$ and $(T4 > P P(A|F_1, F_2, F_3) > T5)$, respectively, when the eye parts detection 374 is less accurate. In general, it can be seen that the best results are obtained when the detected eye parts are accurate and the probability determined by the belief determiner 376 is high. If the detected eye parts are less accurate, the modified defects made by the size limiter 334 are still an improvement over the original defects if the probability determined by the belief determiner 376 is appropriately lower. Damage may occur when the detected eye parts are less accurate and the belief determiner 376 mistakenly attributes a very high confidence to the detected eye parts, as can be seen by the modified defects of the fourth column.

Referring back to FIG. 6, The modified defect is input to the color modifier 336 for improving the color of the digital image pixels that are included in the modified defect. The color modifier 336 modifies the color of pixels of the modified defect to reduce the redeye effect, producing an improved digital image 320. The output of the color modifier 336 is a color modified image p(x,y) with a corrected redeye defect (e.g. a human pupil appears black instead of red.)

In a particular embodiment, the method of correcting the colors of the pixels of the modified defect is the following. As previously stated, a color image includes one or more color component values (or channel) of color information. In an original digital image 302 having red, green and blue color components, there are red $p_R(x,y)$, green $p_G(x,y)$, and blue $p_B(x,y)$ component values for each pixel position in the image p(x,y). It is determined which color component is least sensitive to red light. In the case of common digital cameras that produce images with red, green, and blue color components, the color component with the least sensitivity to red light is the blue component. Then the color of each pixel included in the modified defect is corrected as follows: All color component values are replaced with the color component of the digital image having the least sensitivity to red light. When the color component with the least sensitivity to red light is the blue component, then the correction is as follows: for each pixel in the modified defect, the color is modified by replacing the values of every color component with that of the blue color component value.

The color modification of pixels included in the modified defect for digital images having red, green and blue color components can be described as:

$$p_R(x,y) = p_B(x,y)$$

$$p_G(x,y) = p_B(x,y)$$

Notice that the blue color component does not need to be modified and the glint of the eye can be treated with the same correction technique as the redeye pixels, thus this correction has the advantage that it is very fast.

Finally, the color modified digital image output from the color modifier 336 is input to the defect blender 338 for reducing the visibility of the border between the defect pixels and the border pixels. A spatial operator is computed and applied.

In a particular embodiment, the spatial operator is an N×N filter. The size N is determined based on the size of the modified defect. Preferably, if modified defect includes fewer than 28 pixels, then N=3, otherwise N=5. Using a smaller spatial operator to blend a smaller defect correction prevents excessive blurring that can lead to objectionable blurring of a human subject's eyes. To preserve phase, N must be odd.

The spatial operator is preferably a symmetric lowpass filter. The relative magnitudes of the coefficients of the spatial operator F(i,j) are:

$$F(i, j) = [N - |i| - |j|]^2 \text{ for } |i|, |j| \le \frac{N-1}{2} = D$$

Filter F(i,j) is then normalized such that the sum of all coefficients is 1.0.

The defect blender 338 operates as follows. For each pixel, a local N×N neighborhood is examined. The number of pixels P belonging to the modified defect within the local neighborhood is tabulated. The number P can range between 0 and $N^2$, inclusive. When the number P is either 0 (no pixels belong to the modified defect region) or $N^2$ (all pixels in the local neighborhood belong to the modified defect region) the pixel is left unchanged. Otherwise, for each color channel that was modified by the color modifier 336 (recall that in the preferred embodiment for a digital image with red, green and blue color components, the blue color component is not modified by the color modifier 336 and therefore is not modified by the defect blender 338), a blurred pixel value $B_C(x,y)$ is calculated by convolution as follows:

$$B_C(x, y) = \sum_{m=-D}^{m=D} \sum_{n=-D}^{n=D} p_C(x-m, y-n) * F(m, n)$$

The improved pixel value is:

$$I_C(x,y) = (1-W)p_C(x,y) + W B_C(x,y)$$

where

W is a weight related to the aforementioned number of pixels P in the local N×N neighborhood belonging to the modified defect. The preferred weight W is:

$$W = 1 - 2\left|\frac{P}{N^2} - \frac{1}{2}\right|$$

W ranges from 0 to 1 and is maximized when the local neighborhood is centered on the border between pixels belonging to modified defect and non-defect pixels in the image.

The improved pixel values are substituted into the color modified image, producing the output improved digital image 320. The improved digital image 320 has been improved by modifying redeye affected pixels, producing an image with naturally appearing human pupils. For example, in a particular embodiment, information including the distance between the redeye defect positions, age classification, and blur amount in the optical system that captured the image are all be used to find the iris/sclera boundary and/or the pupil/iris boundary. From this information, a limiting circle is created. The limiting circle is then used to trim a grown defect, removing pixels that would otherwise have contributed to an objectionable over-correction. The output of the size limiter 334 is a modified defect.

The methods can be combined with other procedures to better locate candidate eyes or utilize eye feature information or both. For example, redeyes defects can be corrected using one or more of: inter eye distance, a determination of age class, distance of pixels from a seed location or centroid, blue channel values, or other features disclosed in U.S. patent application Ser. No. 10/792,079, filed Mar. 3, 2004, entitled: CORRECTION OF REDEYE DEFECTS IN IMAGES OF HUMANS", in the name(s) of Andrew C. Gallagher and Jay S. Schildkraut, which is hereby incorporated herein by reference.

The invention has been described in detail with particular reference to certain preferred embodiments thereof, but it will be understood that variations and modifications can be effected within the spirit and scope of the invention.

The invention claimed is:

1. An eye detection method for use with a digital image having a plurality of pixels, said method comprising the steps of:
    locating a plurality of candidate eyes within the image;
    finding pixels of said digital image having a predetermined characteristic and a predetermined association to respective said eyes, to provide pixels of interest;
    grouping said pixels of interest associated with each of said eyes into a plurality of different groups;
    fitting parametric boundaries on each of said groups to define a plurality of detected eye features, said boundaries having a predefined uniform shape and a size matched to a respective said group;
    scoring each of said detected eye features as to a geometric relationship between the respective one of said boundaries and said pixels of interest associated with the respective said eye to provide respective eye feature scores.

2. The method of claim 1 wherein said groups are of uniform size.

3. The method of claim 1 wherein said groups each have a number of pixels minimally sufficient to define said parametric boundaries.

4. The method of claim 3 wherein each of said boundaries is defined by a polynomial.

5. The method of claim 3 wherein said boundaries are circles.

6. The method of claim 5 wherein each of said groups consists of three pixels.

7. The method of claim 1 wherein each of said boundaries is defined by a polynomial.

8. The method of claim 1 wherein said boundaries are circles.

9. The method of claim 1 wherein said finding further comprises identifying a local neighborhood relative to each of said candidate eyes.

10. The method of claim 9 wherein said locating further comprises detecting a plurality of pairs of candidate eyes, and the size of said local neighborhoods is a function of the separation of members of respective said pairs of candidate eyes.

11. The method of claim 10 wherein said candidate eyes each have a redeye defect and said locating further comprises finding respective said redeye defects.

12. The method of claim 9 wherein said finding further comprises producing a map of values of a predetermined property for each of said local neighborhoods; and identifying positions on each said map having said values of said property in a predefined range.

13. The method of claim 12 wherein said map includes at least one of: edge values, color values, and color adjacency values.

14. The method of claim 9 wherein said finding further comprises producing an edge map of each of said local neighborhoods; and identifying positions on each said edge map having an edge magnitude greater than a predefined threshold to define said pixels of interest.

15. The method of claim 9 wherein said scoring of each of said detected eye features further comprises ascertaining separations of said pixels of interest from the respective said boundary.

16. The method of claim 15 wherein said scoring of each of said detected eye features further comprises counting a number of said pixels of interest within a predetermined distance of the respective said boundary.

17. The method of claim 16 wherein said distance is 0.7 pixels.

18. An eye detection method for use with a digital image having a plurality of pixels, said method comprising the steps of:
locating one or more candidate eyes within the image;
identifying one or more local neighborhoods, each said local neighborhood being inclusive of and larger than a respective one of said candidate eyes;
determining a plurality of different groups of pixels of interest within each of said local neighborhoods;
fitting predefined parametric boundaries on each of said groups to define a plurality of detected eye features;
scoring each of said detected eye features as to a geometric relationship between pixels of interest in the local neighborhood and the respective said boundary to provide respective eye feature scores.

19. The method of claim 18 further comprising, in each said local neighborhood, selecting one of said detected eye features having a highest ranked one of said eye feature scores to provide selected eye features.

20. The method of claim 19 wherein said locating further comprises detecting redeye defects and said method further comprises modifying said redeye defects based upon said selected eye features.

21. The method of claim 20 wherein said modifying further comprises revising respective said redeye defects in accordance with respective said selected eye features.

22. The method of claim 18 wherein said scoring of each of said detected eye features further comprises ascertaining the number of said pixels of interest that are within a small distance of the respective said boundary.

23. The method of claim 18 wherein each of said boundaries is defined by a polynomial.

24. The method of claim 23 wherein said groups of pixels of interest each have a number of pixels minimally needed to define the respective said polynomial.

25. The method of claim 18 wherein said boundaries are circles.

26. The method of claim 18 wherein said groups of pixels of interest each have a number of pixels minimally needed to define the respective said parametric boundary.

27. The method of claim 26 wherein said parametric boundaries are circles and each of said groups consists of three pixels.

28. The method of claim 18 wherein said locating further comprises detecting one or more redeye defect pairs.

29. The method of claim 28 wherein the size of said local neighborhoods is a function of the separation of members of respective redeye defect pairs.

30. The method of claim 28 wherein each said local neighborhood has an upper left corner having pixel coordinates, which are the minimum of the x and y coordinates, respectively, of points B1, B2, B3, and B4, and has a lower right corner having pixel coordinates, which are the maximum of the x and y coordinates, respectively, of points B1, B2, B3, and B4; wherein $$\text{point } B1 = D0 + b_0 D$$

$$\text{point } B2 = D0 + b_1 D$$

$$\text{point } B3 = D0 + b_2 D_{perp}$$

$$\text{point } B4 = D0 - b_2 D_{perp}$$

where:
D0 is the (x,y) position of a first defect of a respective said defect pair,
D1 is the (x,y) position of the second defect of the respective said defect pair,
D is a vector from D0 to D1, such that D=D1−D0,
$D_{perp}$ is a vector extending through D0 perpendicular to D and having the same length as D, and
$b_0$, $b_1$, and $b_2$ are coefficients.

31. The method of claim 30 wherein $b_0$=0.35, $b_1$=−0.51, and $b_2$=0.2.

32. The method of claim 30 further comprising determining an age class associated with each of said redeye defect pairs and adjusting one or more of $b_0$, $b_1$, and $b_2$ based upon the associated age class.

33. The method of claim 30 further comprising determining a degree of out of plane rotation associated with each of said redeye defect pairs and adjusting one or more of $b_0$, $b_1$, and $b_2$ based upon the associated degree of out of plane rotation.

34. The method of claim 30 wherein said boundaries are circles, and said fitting further comprises excluding from consideration ones of said groups fit to circles having a radius beyond a range of maximum and minimum radii given by:

$$r_{max} = R_x \|D\| + B$$

$$r_{min} = R_n \|D\| + B$$

where
$r_{max}$ is the maximum radius,
$r_{min}$ is the minimum radius,
$\|D\|$ is the length of vector D,
B is imaging system blur, and
$R_n$ and $R_x$ are multipliers.

35. The method of claim 34 wherein B is 2 pixels, $R_n$ is 0.06, and $R_x$ is 0.14.

36. The method of claim 34 further comprising further comprising determining an age class of adult or child associated with each of said redeye defect pairs and wherein $R_n=0.06$ and $R_x=0.12$, when the respective age class is adult, and $R_n=0.09$ and $R_x=0.14$, when the respective age class is child.

37. The method of claim 18 wherein said determining further comprises producing an edge map of each of said local neighborhoods.

38. The method of claim 37 wherein said determining further comprises identifying positions on each said edge map having an edge magnitude greater than a predefined threshold to define said pixels of interest.

39. The method of claim 38 wherein said threshold is predefined as a dynamically selected value such that a predetermined percentage of the pixels of the local neighborhood are pixels of interest.

40. The method of claim 39 wherein said predetermined percentage is at least 2 percent of the pixels of the local neighborhood.

41. The method of claim 38 wherein said boundaries are circles.

42. The method of claim 41 wherein said groups each include two pixels and said fitting further comprises ascertaining from said edge map, local edge orientations at said two pixels.

43. The method of claim 42 wherein said scoring of each of said detected eye features further comprises ascertaining the number of said pixels of interest that are within a predetermined distance of the respective said boundary.

44. The method of claim 43 wherein said scoring further comprises excluding from consideration detected eye features having local edge orientations that are beyond $\pi/24$ radians from tangency at one or both of said pixels of said group.

45. The method of claim 41 wherein said groups each include three pixels.

46. The method of claim 41 wherein said determining and fitting steps further comprise applying one or more stages of Hough transform to said pixels of interest within each of said local neighborhoods.

47. The method of claim 18 wherein said fitting further comprises excluding from consideration pixels of said groups at more than a predetermined distance from respective said boundaries.

48. The method of claim 47 wherein said distance is 0.7 pixels.

49. The method of claim 47 wherein said scoring further comprises, following said excluding, classifying non-excluded pixels of said groups into lateral pixels and longitudinal pixels and weighting said lateral pixels and said longitudinal pixels differently.

50. The method of claim 18 wherein:
said locating further comprises detecting a plurality of pairs of candidate eyes;
the size of said local neighborhoods is a function of the separation of members of respective said pairs of candidate eyes;
said boundaries are circles; and
said scoring of each of said detected eye features further comprises counting a number of said pixels of interest within a predetermined distance of the respective said boundary, and assigned a weight to each of said pixels of interest within said predetermined distance of the respective said boundary, each said weight being based upon an angle formed by a line joining the respective pixel of interest and the center of the respective boundary and a line joining the members of the respective pair of candidate eyes.

51. An eye detection method for use with a digital image having a plurality of pixels, said method comprising the steps of:
locating one or more redeye defect pairs in the digital image;
identifying a local neighborhood relative to each member of each of said redeye defect pairs;
ascertaining pixels of interest within each said local neighborhood, said pixels of interest each having a predetermined characteristic;
determining a circle best fitting said pixels of interest in each said local neighborhood.

52. The method of claim 51 further comprising using each said circle to correct the respective said redeye defect pairs.

53. The method of claim 52 wherein each said circle defines a detected iris and said using further comprises removing redeye only within respective said circles.

54. The method of claim 52 wherein each said circle defines a detected pupil said using further comprises removing redeye only within respective said circles.

55. The method of claim 51 wherein said predetermined characteristic is an edge magnitude and edge orientation.

56. The method of claim 51 wherein said determining further comprises producing an edge map of each of said local neighborhoods; and identifying positions on each said edge map having an edge magnitude greater than a predefined threshold to define said pixels of interest.

57. The method of claim 51 wherein the size of said local neighborhoods is a function of the separation of members of respective said redeye defect pairs.

58. The method of claim 51 wherein said determining further comprises fitting a plurality of circles on different groups of said pixels of interest within each of said local neighborhoods and scoring said circles based upon relative positions of pixels of interest within respective said local neighborhoods.

59. A method of detecting a human iris in a digital image having a plurality of pixels and one or more redeye defects, said method comprising:
locating one or more redeye defect pairs in the digital image;
identifying a local neighborhood relative to each member of each of said redeye defect pairs, said local neighborhoods each having a size that is a function of the separation of members of the respective said redeye defect pair;
producing an edge map of each of said local neighborhoods;
identifying positions on each said edge map having an edge magnitude greater than a predefined threshold to define pixels of interest;
grouping said pixels of interest associated with each of said redeye defects into a plurality of different groups, each group having two pixels;
fitting circles on each of said groups, wherein said edge directions are tangent to the respective said circle at each of said pixels of each said group, to define a plurality of detected eye features;
counting a number of said pixels of interest within a predetermined distance of each of said circles; and
assigning a weight to each of said pixels of interest within said predetermined distance of respective said circles.

60. A method of correcting redeye defects in an image having pixels of a human subject, said method comprising:

locating a pair of redeye defects representing a right eye and a left eye, said defects each having one or more pixels;

identifying a local neighborhood associated with each of said eyes;

searching in each said local neighborhood to detect a candidate eye feature having a circular shape and provide a pair of detected eye features;

using said detected eye features and associated said redeye defects to correct the image.

61. The method of claim 60 wherein each said circle defines a detected iris and said using further comprises removing redeye only within respective said circles.

62. The method of claim 60 wherein each said circle defines a detected pupil said using further comprises removing redeye only within respective said circles.

63. A computer program product for use with a digital image having a plurality of pixels, the computer program product comprising computer readable storage medium having a computer program stored thereon for performing the steps of:

locating a plurality of candidate eyes within the image;

finding pixels of said digital image having a predetermined characteristic and a predetermined association to respective said eyes, to provide pixels of interest;

grouping said pixels of interest associated with each of said eyes into a plurality of different groups;

fitting parametric boundaries on each of said groups to define a plurality of detected eye features, said boundaries having a predefined uniform shape and a size matched to a respective said group;

scoring each of said detected eye features as to a geometric relationship between the respective one of said boundaries and said pixels of interest associated with the respective said eye to provide respective eye feature scores.

64. An eye detection apparatus for use with a digital image having a plurality of pixels, comprising:

means for locating a plurality of candidate eyes within the image;

means for finding pixels of said digital image having a predetermined characteristic and a predetermined association to respective said eyes, to provide pixels of interest;

means for grouping said pixels of interest associated with each of said eyes into a plurality of different groups;

means for fitting parametric boundaries on each of said groups to define a plurality of detected eye features, said boundaries having a predefined uniform shape and a size matched to a respective said group;

means for scoring each of said detected eye features as to a geometric relationship between the respective one of said boundaries and said pixels of interest associated with the respective said eye to provide respective eye feature scores.

* * * * *